United States Patent
Nishida et al.

(10) Patent No.: US 8,493,658 B2
(45) Date of Patent: Jul. 23, 2013

(54) POLARIZER AND DISPLAY DEVICE INCLUDING POLARIZER

(75) Inventors: Jiro Nishida, Atsugi (JP); Daisuke Kubota, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 1046 days.

(21) Appl. No.: 12/213,616

(22) Filed: Jun. 23, 2008

(65) Prior Publication Data

US 2009/0009865 A1   Jan. 8, 2009

(30) Foreign Application Priority Data

Jul. 6, 2007   (JP) .................. 2007-179034

(51) Int. Cl.
*G02B 5/30* (2006.01)
*G02B 27/28* (2006.01)
*B05D 5/06* (2006.01)

(52) U.S. Cl.
USPC ............. 359/485.05; 359/487.05; 427/163.1

(58) Field of Classification Search
USPC ..................................... 359/485.05
See application file for complete search history.

(56) References Cited

U.S. PATENT DOCUMENTS

| | | | |
|---|---|---|---|
| 6,532,111 B2 | 3/2003 | Kurtz et al. | |
| 7,046,442 B2 | 5/2006 | Suganuma | |
| 7,158,302 B2 * | 1/2007 | Chiu et al. | 359/485.03 |
| 7,227,684 B2 | 6/2007 | Wang et al. | |
| 7,233,563 B2 | 6/2007 | Ueki et al. | |
| 7,268,946 B2 | 9/2007 | Wang | |
| 2006/0126699 A1 | 6/2006 | Kaneda | |
| 2006/0164571 A1 | 7/2006 | Broer et al. | |
| 2007/0024776 A1 | 2/2007 | Jeng et al. | |
| 2007/0086762 A1 * | 4/2007 | O'Keefe et al. | 396/16 |
| 2007/0131928 A1 | 6/2007 | Kwak et al. | |
| 2007/0297053 A1 | 12/2007 | Wang | |
| 2008/0129931 A1 | 6/2008 | Takahashi et al. | |

FOREIGN PATENT DOCUMENTS

| | | |
|---|---|---|
| EP | 1 239 308 | 9/2002 |
| EP | 1669780 A | 6/2006 |
| EP | 1840603 A | 10/2007 |
| EP | 1 909 121 | 4/2008 |

(Continued)

OTHER PUBLICATIONS

Chinese Office Action (Application No. 200810130427.8) Dated Apr. 26, 2011.

*Primary Examiner* — Jade R Chwasz
(74) *Attorney, Agent, or Firm* — Eric J. Robinson; Robinson Intellectual Property Law Office, P.C.

(57) ABSTRACT

A polarizer in which parallel transmittance $T_P$ is increased and crossed transmittance $T_C$ is provided. Instead of arranging a plurality of all metal wires on one plane, a plurality of metal wires is separately formed on at least two different parallel planes, and adjacent meal wires among the plurality of metal wires are staggered in the polarizer. The heights of a first group of metal wires formed on a first plane and a second group of metal wires formed on a second plane, from a surface of the light-transmitting substrate are different. Further, a metal wire of the second group is provided to be more distant from the light-transmitting substrate than the first group of metal wires by distance D, and the distance D is smaller than the thickness of the first group of metal wires.

44 Claims, 15 Drawing Sheets

FOREIGN PATENT DOCUMENTS

| | | |
|---|---|---|
| JP | 2002-328234 | 11/2002 |
| JP | 2005-037900 A | 2/2005 |
| JP | 2005-172844 | 6/2005 |
| JP | 2006-514751 | 5/2006 |
| JP | 2006-163291 A | 6/2006 |
| JP | 2007-033559 | 2/2007 |
| JP | 2007-047251 A | 2/2007 |
| JP | 2007-310249 A | 11/2007 |
| JP | 2008-268299 A | 11/2008 |
| JP | 2008268299 A | 11/2008 |
| WO | WO 2004/019070 | 3/2004 |
| WO | WO 2004/072692 | 8/2004 |
| WO | WO-2006/064693 | 6/2006 |

\* cited by examiner

POLARIZER AND DISPLAY DEVICE INCLUDING POLARIZER

BACKGROUND OF THE INVENTION

1. Field of the Invention

The present invention relates to a polarizer and a semiconductor device including the polarizer. The present invention relates to, for example, an electronic device equipped with an electro-optic device typified by a liquid crystal display panel using a polarizer or a light-emitting display device including an organic light-emitting element using a polarizer, as a component.

Note that in this specification, the term "semiconductor devices" refers to any type of devices in general, which can operate using semiconductor characteristics. Electro-optic devices, semiconductor circuits, and electronic devices are all included in the category of the semiconductor devices.

2. Description of the Related Art

Light of which electric vibration is biased to a certain direction is referred to as polarized light whereas light having random electric vibration is called natural light. The display principle of liquid crystal panels uses polarization. In order to obtain the polarization, film polarizers are widely implemented. The film polarizers is formed by extending a film of a polymeric material containing iodine in a certain direction to transmit only light that is linearly polarized in a certain direction and absorb polarized light that is perpendicular to the linearly polarized light.

However, polarizers using iodine have low heat resistance, and liquid crystal panels including the polarizers can be used only under limited conditions.

Further, as a polarizer having higher heat resistance than polarizers using iodine, a polarizer having a wire grid structure in which long thin metal wires are arranged in parallel to a substrate surface is disclosed in Reference 1 (Japanese Published Patent Application No. 2002-328234).

Further, a polarizer having a wire grid structure in which a plurality of thin linearly elongated metal layers are arranged, porous layers are provided in grooves between the plurality of thin linearly elongated metal layers, and thin linearly elongated metal layers are provided on the bottom of the grooves are provided, is disclosed in Reference 2 (Japanese Published Patent Application No. 2007-33559).

SUMMARY OF THE INVENTION

With respect to a polarizer having a wire grid structure, the present inventors determined tendency of transmittance $T_C$ of light having an electric field component parallel to an aluminum line (TE wave) and transmittance $T_P$ of light having an electric field constituent perpendicular to the aluminum line (TM wave) in the case where each aluminum line has a width L, and aluminum lines have a spacing S. Note that the thickness t of an aluminum line was assumed to be 170 nm to obtain the relationships of the width L, the spacing S, the transmittance $T_C$, and the transmittance $T_P$.

The transmittance $T_C$ increases when the width L is increased while S/L ratio is kept constant. The transmittance $T_C$ also increases when the S/L ratio is increased while the width L is constant.

Further, the transmittance $T_P$ increases when the width L is reduced while the S/L ratio is constant. The transmittance $T_P$ also increases when the S/L ratio is increased while the width L is constant.

An index of contrast is the ratio of the transmittance $T_P$ and the transmittance $T_C$ ($T_P/T_C$). The above results show that even when the width L and spacing S are controlled, it is difficult to realize a polarizer having a wire grid structure with a sufficient ratio of transmittance $T_P$ and transmittance $T_C$.

Further, when the thickness t of the aluminum line is increased, the ratio ($T_P/T_C$) increases, whereas the transmittance $T_P$ and the transmittance $T_C$ decrease. The change amounts of the transmittance $T_P$ and the transmittance $T_C$ with respect to increase in the thickness t of the aluminum line differ from each other. The extinction coefficient $k_P$ of the transmittance $T_P$ and the extinction coefficient $k_C$ of the transmittance $T_C$ can be calculated from the change amounts. Transmittance $T_P$ is also referred to as parallel transmittance, and is a transmittance of light having a magnetic field component parallel to the polarization axis (direction of the aluminum line) of the polarizer having a wire grid structure. Transmittance $T_C$ is also referred to as crossed transmittance, and is a transmittance of light having a magnetic field component perpendicular to the polarization axis (direction of the aluminum line) of the polarizer having a wire grid structure.

Since a polarizer having a wire grid structure has a higher extinction coefficient $k_C$ than a polarizer using iodine, absorptance is high even when the thickness t is thinner than 1 μm (the thickness t is assumed to be 170 nm which is smaller than 1 μm). Therefore, a polarizer having a wire grid structure can be made thinner than a polarizer using iodine. The thickness of the polarizer using iodine is greater than 1 μm.

However, a polarizer having a wire grid structure has a lower extinction coefficient ratio ($k_P/k_C$) as compared to a polarizer using iodine, and under such conditions that the same contrast is obtained, the transmittance $T_P$ is significantly low. When the transmittance $T_P$ is significantly low, for example, electro-optic devices or light-emitting display devices which are equipped with the polarizer having a wire grid structure as a component cannot perform bright display.

In view of the foregoing, it is an object of the present invention to provide a polarizer having a wire grid structure, with which the transmittance $T_P$ is increased without significantly decreasing the transmittance $T_P$, and the transmittance $T_C$ is reduced. Further, it is another object to reduce color irregularities in a display device by reducing wavelength dependence of optical properties due to interference.

The present inventors repeated various investigations on the wire grid structure to find a polarizer having a novel structure with which the parallel transmittance $T_P$ is increased and crossed transmittance $T_C$ is decreased.

The structure is a polarizer having a cross-sectional structure illustrated in FIG. 1. FIG. 1 is a schematic diagram of a cross section taken perpendicular to the long-side direction of one metal wire forming a wire grid structure. Instead of arranging a plurality of all metal wires on one plane, a plurality of metal wires is separately formed on at least two different parallel planes over a substrate surface, and adjacent meal wires among the plurality of metal wires are staggered in the polarizer. Specifically, over a light-transmitting substrate, a plurality of metal wires are provided so that the long-side direction of the metal wires is parallel to the substrate surface and each spacing S is almost even. The plurality of metal wires can be broadly divided into two groups, and a first group of metal wires 101 disposed on a first plane parallel to the substrate surface is formed over the light-transmitting substrate, and a second group of metal wires 102 disposed on a second plane parallel to the substrate surface are formed at a higher position than the first group of metal wires. Note that the first plane and the second plane are two different parallel planes both of which are placed over the substrate surface. Further, each of the first group of metal wires and each of the second group of metal wires are alternately arranged to be adjacent to each other. Note that in FIG. 1, reference numeral 110 denotes the direction of incident light.

In one of preferable structures, the first group of metal wires includes at least two metal wires, and the second group of metal wires include two or more metal wires. Further, approximately half of the total metal wires correspond to the first group of metal wires and the other corresponds to the second group of metal wires. In a polarizer of the present invention, the metal wires have spaces therebetween. The cross-sectional structure shown in FIG. 1 is a structure in which a first group of metal wires are formed on a first plane, and a second group of metal wires are formed on a second plane, which is an example in which a plurality of metal wires are formed on two planes, and without limitation to two planes, a plurality of metal wires may be formed on three or more planes. Note that such a plurality of metal wires of a polarizer is arranged in cycles.

In this specification, "in cycles" means a structure in which, when the total of metal wires is N (N is an integer of 4 or more), one of a second group of metal wires is provided adjacent to one of a first group of metal wires in the horizontal direction, another of the first group of metal wires is provided adjacent to the one of the second group of metal wires in the horizontal direction, and these three metal wires are disposed sequentially and repeatedly. That is, a structure in which N/2 pairs each of which has one of the first group of metal wires and one of the second group of metal wires are arranged. Note that when N is an odd number, either the first group of metal wires or the second metal wires has one more metal wire; therefore, almost half of the total metal wires is assumed to corresponds to the first group.

Note that the distance between the centers in the cross sections of the first group of metal wires and a substrate surface is different from the distance between the centers in the cross sections of the second group of metal wires and the substrate surface, and metal wires having the centers closer to the substrate surface are referred to as the first group of metal wires, and metal wires having the centers farther from the substrate surface are referred to as the second group of metal wires.

The simulation results of parallel transmittance $T_P$ with respect to the wavelengths of the incident light 110 of 400 nm, 500 nm, 600 nm, and 700 nm are shown in FIG. 2, and the simulation results of crossed transmittance $T_C$ are shown in FIG. 3. The simulations were performed using optical calculation simulation software "DiffractMOD" produced by Rsoft Design Group, Inc.

Further, the simulations were performed assuming that a metal wire is formed of aluminum and the metal wire fixedly has a width L of 25 nm and a film thickness b of 240 nm. A spacing S between adjacent two metal wires is 25 nm.

Further, the vertical positional difference between one of the first group of metal wires 101 and one of the second group of metal wires 102 which are adjacent to each other is assumed to be distance D, and the distance D is varied in the range of 0 nm to 360 nm. Note that when the distance D is 0 nm, a conventional wire grid structure in which metal wires are arranged at the same vertical positions at regular intervals in a line is obtained. The wire grid structure in which the distance D is 0 nm corresponds to the structure described in the above Reference 1.

The vertical axis in FIG. 2 indicates the ratio of parallel transmittances $T_P$ to the parallel transmittance in the case where the distance D=0 nm is assumed to be 1 for comparing a parallel transmittance with the parallel transmittance in the case of distance D=0 nm. In other words, FIG. 2 indicates the ratio between the parallel transmittance in the case of distance of D=0 nm and the parallel transmittance in the case of distance D (D>0).

From the results shown in FIG. 2, when the distance D is greater than 0 nm, increase in the parallel transmittance $T_P$ can be observed in the range of wavelengths from 400 nm to 700 nm. Since all wires are formed in the same layer in the conventional wire grid structure, density of the metal wires in the layer is uniform. In contrast to the conventional wire grid structure, in a wire grid structure of the present invention, there are a region having high density of metal wires and a region having low density of metal wires in a direction perpendicular to the incident light 110. In the region having high density of metal wires, the total number of metal wires is higher because both the first group of metal wires and the second group of metal wires are arranged. Meanwhile, in a region having low density of metal wires, the number of metal wires is lower because only either the first group of metal wires or the second group of metal wires are arranged. Due to the presence of the region having low density of metal wires, the parallel transmittance $T_P$ is increased, in other words, the amount of transmitted light is increased as in FIG. 2. In the structure shown in FIG. 1, the metal wire density (the number of metal wires per plane perpendicular to the direction of light travel) varies in the travel direction of the incident light 110, and the metal wire density varies from a low value to a high value, or from a high value to a low value.

Further, the vertical axis in FIG. 3 indicates the ratio of crossed transmittances $T_C$ to the crossed transmittance in the case where distance D=0 nm is assumed to be 1 for comparing a crossed transmittance with the transmittance in the case of the distance D=0 nm. In other words, FIG. 3 indicates the ratio between the crossed transmittance in the case of distance of D=0 nm and the crossed transmittance in the case of a distance D (D>0).

From the results shown in FIG. 3, when the distance D is greater than 0 nm, decrease in the crossed transmittance $T_P$ can be observed in the range of wavelengths from 600 nm to 700 nm. When the interval between adjacent metal wires in the wire grid structure is short enough with respect to optical resolution, the wire grid structure with increased distance D operates in a similar manner to a structure in which the thickness of a polarizer is larger, and thus absorptance is increased. Therefore, the crossed transmittance $T_C$ in FIG. 3 is decreased.

Further, in FIG. 2, in the case where the distance D is greater than the film thickness b=240 nm, parallel transmittance $T_P$ with respect to a wavelength of 400 nm is decreased. In view of the above, in order to obtain a polarizer which increases parallel transmittance $T_P$ and decreases crossed transmittance $T_C$, it is preferable that, in the wire grid structure, the metal wire density of a region where the first group and the second group overlap with each other in the direction perpendicular to the incident light is lower.

Further, when the distance D is sufficiently larger than the film thickness b=240 nm, the first group of metal wires 101 and the second group of metal wires 102 are distant in the direction perpendicular to the incident light, such a wire grid structure corresponds to a conventional wire grid structure in which a metal wire of the second group of metal wires is not placed between two adjacent metal wires of the first group of metal wires 101. A wire grid structure in which the distance D is sufficiently larger than the film thickness b of metal wires corresponds to the structure of Embodiment Mode 6 of the above Reference 2.

Thus, from the results of FIG. 2 and FIG. 3, the structure disclosed in Reference 2 is a polarizer which decreases parallel transmittance $T_P$.

Further, for comparison, the parallel transmittance and the crossed transmittance in a structure shown in FIG. 16 were also obtained using the optical calculation simulation software "DiffractMOD" produced by Rsoft Design Group, Inc. The structure shown in FIG. 16 is a wire grid structure in which metal wires have the same thickness, and six metal wires are provided as one set. The distance between two metal wires arranged at a light incidence interface 1103 is denoted as W. With the structure shown in FIG. 16, as a result, parallel transmittance was found to increase. Further, when the distance W is large, crossed transmittance is also increased, and contrast was found to decrease. Note that reference numeral 1102 denotes the direction of incident light 1102 in FIG. 16.

Further, it can be said from simulation results obtained from the structure shown in FIG. 16 that a structure in which the distance W is smaller is preferable. In the present invention, a wire grid structure is obtained in which staggered adjacent two parallel metal wires correspond to one cycle and the distance W is decreased; thus, parallel transmittance $T_P$ is increased, and crossed transmittance $T_C$ is decreased. The parallel transmittance $T_P$ is increased and the crossed transmittance $T_C$ is reduced; therefore, for example, an electro-optic device or a light-emitting display device which uses the polarizer of the invention as a component can perform display with both brightness and high contrast.

A structure of the present invention which is disclosed in the present specification is a display device including a polarizer. The polarizer includes a light-transmitting substrate; a first group of metal wires each having a first center on a first plane which is parallel to the light-transmitting substrate; and a second group of metal wires each having a second center on a second plane which is parallel to the light-transmitting substrate. Further, the first group of metal wires is parallel to the second group of metal wires in the long-side direction of the metal wires. The height of the first group of metal wires from a surface of the light-transmitting substrate is different from the height of the second group of metal wires. The second group of metal wires are provided to be more distant from the light-transmitting substrate than the first group of metal wires by distance D, and the distance D is smaller than the thickness of the first group of metal wires. In a cross section that is perpendicular to the long-side direction, the first group of metal wires and the second group of metal wires are arranged so that a line connecting the first centers and the second centers forms a zigzag.

Further, in the above structure, the first group of metal wires are evenly spaced and the second group of metal wires are evenly spaced in the short-side direction of the first group of metal wires. Note that the short-side direction of the first group of metal wires is a direction perpendicular to the long-side direction of the first group of metal wires. The long-side direction of the first group of metal wires is a direction in which one metal wire extends.

Further, in the above structure, when the distance D is smaller than the thickness of the first group of metal wires, one metal wire of the second group is placed between adjacent two metal wires of the first group of metal wires. In this case, the metal wire density varies in the direction of travel of incident light, and the metal wire density changes from a low value to a high value, or from a high value to a low value. Further, when the distance D almost equals to the thickness of the first group of metal wires, the density of metal wires provided on a plane perpendicular to incident light becomes uniform.

Note that two directions orthogonal to each other on a substrate surface are referred to as X direction and Y direction, and the long-side direction of the metal wires corresponds to Y direction. A short-side direction of the metal wires corresponds to X direction. The width L of the metal wires and the spacing S between the metal wires are distance in X direction.

Further, in the above structure, the distance between the first plane parallel to the substrate surface and the second plane parallel to the substrate surface is equal to or smaller than the thickness of the first group of metal wires. The distance here refers to the distance in the direction perpendicular to the substrate surface, that is, in Z direction. When the distance between the first plane parallel to the substrate surface and the second plane parallel to the substrate surface is longer than the thickness of the first group of metal wires, wavelength dependence of optical properties due to interference becomes significant.

The structure shown in FIG. 1 can be formed by a nanoimprint method, a photolithography method, an E-beam lithography method, a holography method, a laser etching method, or the like.

Light-transmitting members are provided between the second group of metal wires and the light-transmitting substrate to support the second group of metal wires; preferably, the light-transmitting members have lower refractive index than the light-transmitting substrate.

Another structure of the present invention, which is disclosed in the present specification includes a first group of metal wires over a light-transmitting substrate, light-transmitting members provided between each of the first group of metal wires, over a light-transmitting substrate, and a second group of metal wires over the light-transmitting members. Part of each of the first group of metal wires are provided between each of the second group of metal wires. Further, the thickness of the first group of metal wires is larger than the thickness of the light-transmitting members.

In order to perform polarization separation, when the wavelength of light incident on the polarizer is 400 nm, the interval between the centers of one metal wire and an adjacent metal wire among the first group of metal wires in the cross section of the adjacent two metal wires, that is, a pitch, is 120 nm or less. With the above structure, the length of an interval (pitch) from one metal wire to an adjacent metal wire among the first group of metal wires is ⅓ or less of the wavelength of incident light, desirably ¼ or less thereof. Further, intervals between metal wires of the first group of metal wires, intervals between the second group of metal wires, and intervals between a metal wire of the first group of metal wires and an adjacent metal wire of the second group of metal wires may separately vary within the above range. In addition, the width L of one metal wire is preferably 1/10 or less of the wavelength of incident light. Note that when the wavelength of light incident on the polarizer is 400 nm, the width L of each metal wire of the first group of metal wires and the second group of metal wires is desirably 40 nm or less.

Further, in the above structure, cross-sectional shape of the first group of metal wires and the second group of metal wires, which are perpendicular to the long-side direction of the metal wires, is not limited to a rectangular shape, and they may have another shape, for example, a triangle shape or the like. Further, as the area of the light-transmitting members in the cross sections perpendicular to the long-side direction of the first group of metal wires is smaller, optical properties of the polarizer are improved; therefore, the cross-sectional shape of the light-transmitting members is desirably a rectangular shape with a narrower width than the cross-sectional shape of the second group of metal wires. Further, cross-sectional shape of the light-transmitting members perpendicular to the long-side direction of the first group of metal wires is a trapezoidal shape to stably support the second group of metal wires.

Further, the light-transmitting members may be provided to cover the metal wires for more stably supporting the metal wires to further increase mechanical strength.

For the light-transmitting members, for example, a dielectric substance such as a silicon oxide, a magnesium fluoride, or a resin can be used. The light-transmitting members can be formed by using vacuum deposition, sputtering, PCVD, ion plating, or the like.

Further, the light-transmitting substrate may be processed by etching to form a plurality of grooves and projections, a first group of metal wires are each formed in the grooves, and a second group of metal wires may be each formed over each projection between the grooves in the substrate.

Further, for the light-transmitting substrate, a light-transmitting material such as glass, ceramics, a resin, or the like can be used. Moreover, a high refractive index glass substrate of which refractive index is controlled by controlling impurities in glass can also be used as the light-transmitting substrate. Further, a light-transmitting ceramic may be a polycrystal obtained by adding several mol % of $La_2O_3$ to a solid solution of $PbZrO_3$ and $PbTiO_3$ and sintering it (also referred to as PLZT).

Further, a metal having high reflectivity, such as aluminum, silver, gold, or copper, or an alloy thereof can be used as a material of the metal wires.

Further, the polarizer can be used in devices to which an optical process requiring polarization is applied, without limitation to display devices such as liquid crystal display devices, organic EL light-emitting display devices, or inorganic EL light-emitting display devices. Moreover, a polarizer of the present invention can be applied to electromagnetic waves without limitation to light. Note that in the present specification, light refers to light at least including infrared light and visible light.

DETAILED DESCRIPTION OF THE INVENTION

Embodiment Mode of the present invention will be hereinafter described.

Embodiment Mode 1

Figure 1:
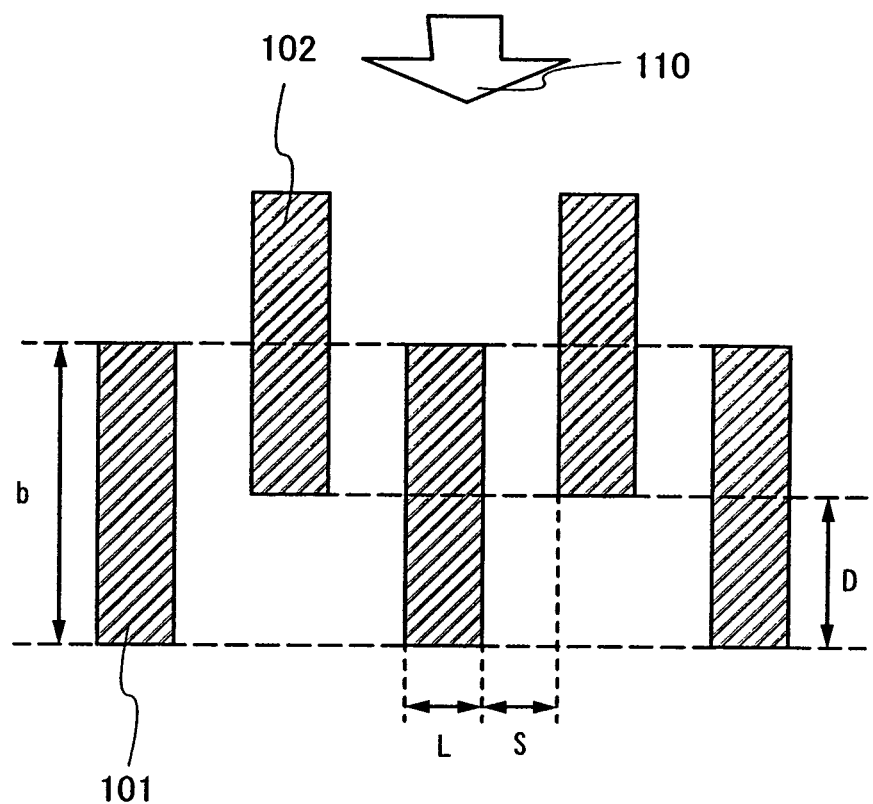
FIG. 1 is a schematic diagram of a wire grid structure of the present invention.
Figure 2:
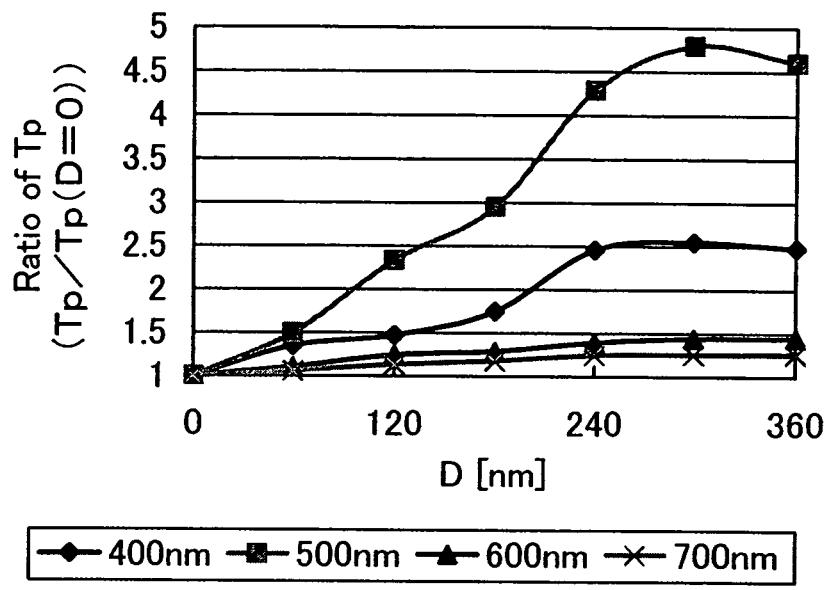
FIG. 2 is a graph illustrating simulation results of parallel transmittance $T_P$ with respect to distance D.
Figure 3:
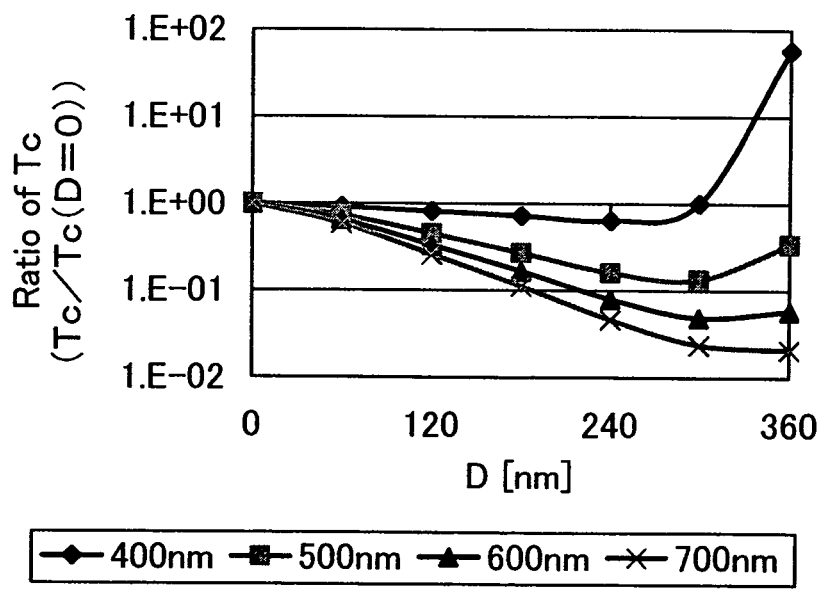
FIG. 3 is a graph illustrating simulation results of crossed transmittance $T_C$ with respect to distance D.
Figure 4A:
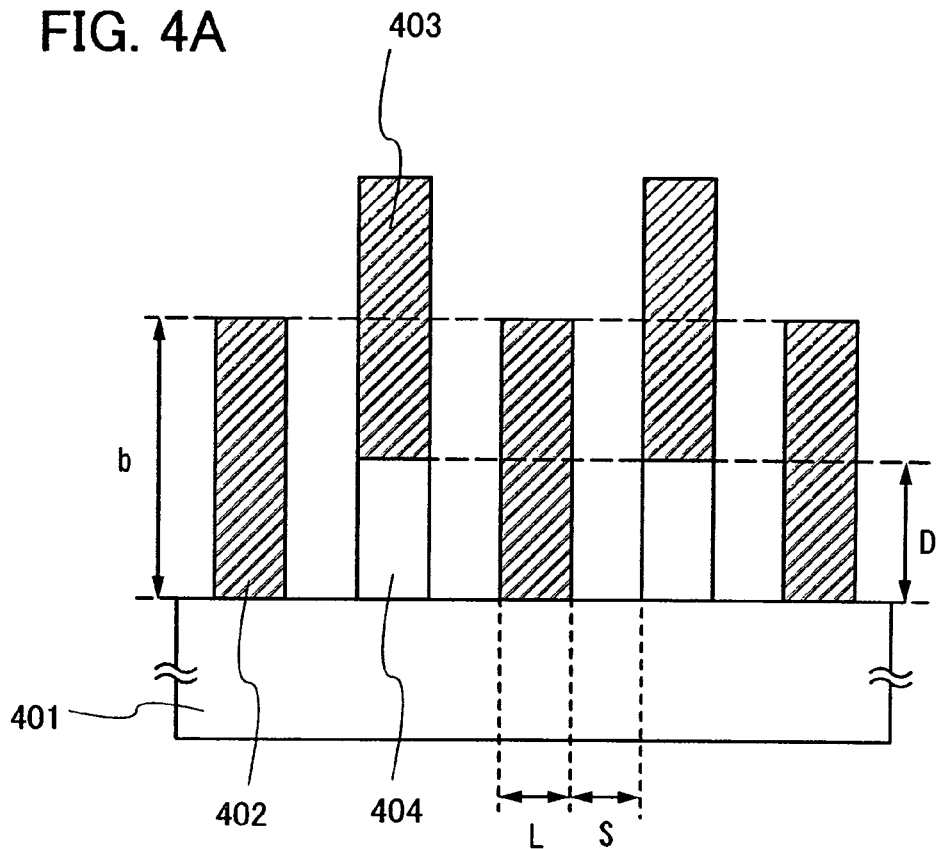
FIG. 4A is a cross-sectional view illustrating an example of a wire grid structure of the present invention.
Figure 4B:
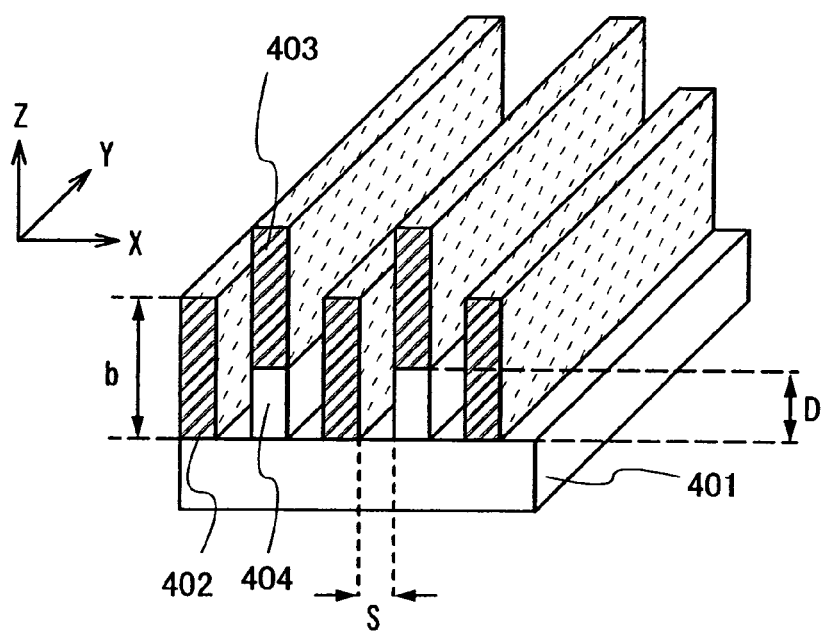
FIG. 4B is a perspective view thereof.

FIG. 4A and FIG. 4B illustrate an example of a polarizer having a wire grid structure of the present invention. A manufacturing method of the polarizer will be described below. FIG. 4A is a cross-sectional view taken perpendicular to a substrate surface, and FIG. 4B is a perspective view corresponding to the diagram in FIG. 4A.

First, a light-transmitting substrate 401 is prepared. A light-transmitting material such as glass, ceramics, or a resin can be used for the light-transmitting substrate 401. Further, a high refractive index glass substrate of which refractive index is controlled by controlling impurities in glass can be used for the light-transmitting substrate 401.

Next, a wire grid structure is formed over the light-transmitting substrate 401. The wire grid structure shown in FIG. 4A and FIG. 4B may be formed by suitably using a nanoimprint method such as a photo nanoimprint method or a thermal nanoimprint method; a photolithography method; an E-beam lithography method; a holography method; laser etching, or the like. A method for manufacturing the wire grid structure shown in FIG. 4A and FIG. 4B is not limited in particular.

For example, after forming a silicon oxide film by PCVD over the light-transmitting substrate 401, patterning is performed using a photolithography method to form light-transmitting members 404. Here, an example of using a silicon oxide for the light-transmitting members 404 is shown; however, a dielectric substance such as magnesium fluoride or a resin may be used. Further, the formation method is not limited to PCVD, and vacuum deposition, sputtering, ion plating, a coating method, or the like can be used.

Then, a first group of metal wires 402 and a second group of metal wires 403 are formed as follows. An aluminum film is formed, a thin film is formed over the aluminum film by a coating method, a mold is pressed against the thin film to form a mask having recesses, the mold is removed from the thin film, and the aluminum film is selectively etched using the mask. As shown in FIG. 4B, the first group of metal wires 402 and the second group of metal wires 403 are arranged in parallel in the long-side direction, that is, in Y direction thereof. Further, the metal wires are arranged at intervals of spacing S that is a distance in the short-side direction, in X direction of the metal wires. Note that the second group of metal wires 403 are formed over the light-transmitting members 404. The distance D corresponding to the thickness of the light-transmitting members 404 is a distance in Z direction, and is also referred to as a distance between the substrate surface and the second group of metal wires 403. When the distance D is greater than 0 nm, the second group of metal wires 403 are arranged to be more distant from the substrate surface than the first group of metal wires 402 by the distance D. Further, the first group of metal wires 402 are formed on a first plane which is parallel to the substrate surface, the second group of metal wires 403 are formed on a second plane parallel to the substrate plane, and the length of the space between the first plane and the second plane in Z direction can be referred to as distance D.

In another manufacturing example, although the number of steps is increased, after forming the first group of metal wires 402, the light-transmitting members 404 may be formed, and then the second group of metal wires 403 may be formed thereover. Alternatively, the light-transmitting members 404 may be formed first, the second group of metal wires 403 are formed, and then the first group of metal wires 402 may be formed.

Further, in order to implement functions of a polarizer, the width of the light-transmitting members 404 is preferably equal to or smaller than the width of the second group of metal wires 403. Therefore, etching may be performed using the second group of metal wires 403 as masks to make the light-transmitting members 404 have a width approximately equal the width of the second group of metal wires 403. Further, the thickness b of the metal wires is assumed to be 50 nm to 800 nm.

Figure 5:
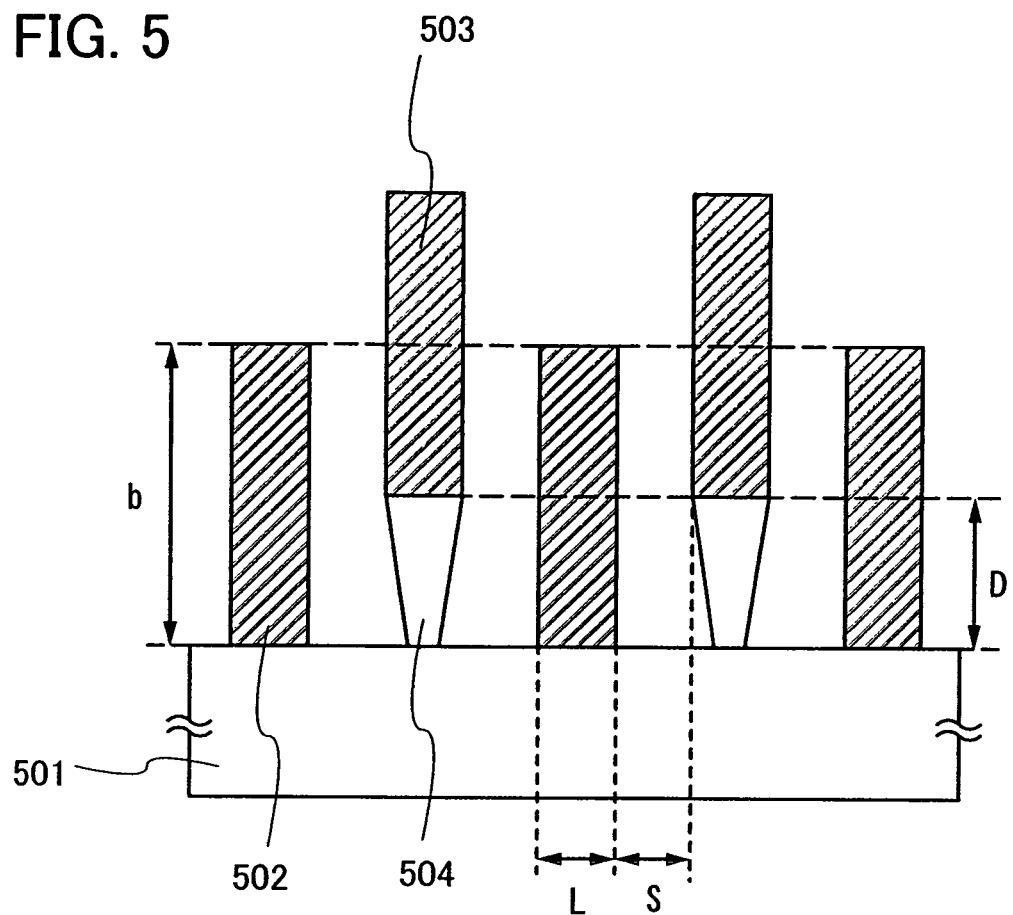
FIG. 5 is a cross-sectional view illustrating an example of a wire grid structure of the present invention.

Further, an example in which the width of the light-transmitting members is reduced by over-etching so that the light-transmitting members have an inverted tapered shape (trapezoidal shape) as shown in FIG. 5. The wire grid structure shown in FIG. 5 includes a first group of metal wires 502 over a light-transmitting substrate 501, and a second group of metal wires 503 over light-transmitting members 504 having an inverted tapered shape.

Embodiment Mode 2

Figure 6:
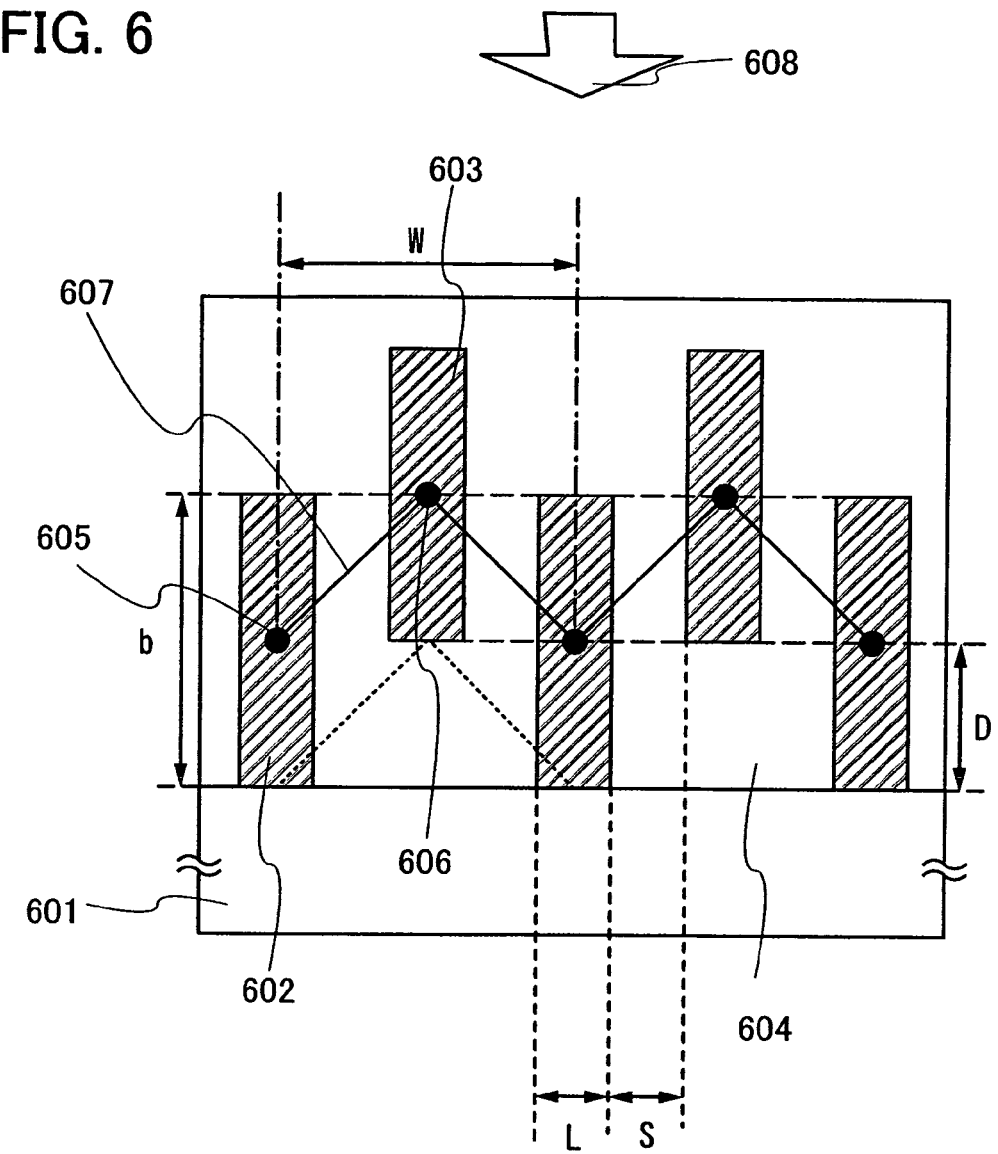
FIG. 6 is a cross-sectional view illustrating an example of a wire grid structure of the present invention.

FIG. 6 illustrates another example of a polarizer having a wire grid structure of the present invention. In this embodiment mode, a polarizer is provided in which a first group of metal wires 602 and a second group of metal wires 603 are covered with a light-transmitting member 604 in order to increase mechanical strength of the wire grid structure. The second group of metal wires 603 have their centers in different arrangement from the centers of the first group of metal wires 602. The centers here refer to the centers of the cross sections taken in the short-side direction of the metal wires, which are perpendicular to the long-side direction thereof, that is, the width direction of the metal wires. For example, in the case where the cross-sections have a quadrangular shape, intersection points of the two lines connecting opposite corners may be a center. Further, the line connecting the centers of plural cross sections of one metal wire can be called a central axis, which is parallel to the long-side direction of the metal wire.

The polarizer shown in FIG. 6 has a light-transmitting substrate 601, a first group of metal wires 602 each having a first center on a first plane which is parallel to the light-transmitting substrate, and a second group of metal wires 603 each having a second center on a second plane which is parallel to the light-transmitting substrate. One metal wire of the second group of metal wires 603 is provided between adjacent two metal wires of the first group of metal wires 602, and the first group of metal wires 602 are parallel to the second group of metal wires 603 in the long-side direction. Further, in the cross section perpendicular to the long-side direction, the first group of metal wires 602 and the second group of metal wires 603 which are provided alternately, are arranged so that a plurality of lines 607 connecting the first centers 605 of the first group of metal wires 602 and second centers 606 of the second group of metal wires 603 forms a zigzag. Further, the virtual line connecting the first centers 605 of the first group of metal wires and the second centers 606 of the second group of metal wires may be called a triangle wave.

Further, in the polarizer shown in FIG. 6, a cycle of two metal wires which are one metal wire of the first group of metal wires 602 and one metal wire of the second group of metal wires 603 which are staggered in parallel is repeatedly provided. Further, the distance W between two metal wires placed at a light incidence interface of a light 608, that is, the distance W between each of the second group of metal wires is narrowed to 120 nm or less.

Further, in this embodiment mode, an aluminum alloy containing a slight amount of silicon is used as a material for the first group of metal wires 602 and the second group of metal wires 603. An aluminum alloy containing a slight amount of neodymium or niobium other than silicon may also be used. When an aluminum film contains silicon, neodymium, niobium, or the like, film quality change such as so-called hillocks or whiskers which is specific to aluminum can be prevented.

Further, in this embodiment mode, a light-transmitting resin is used for the light-transmitting member 604. Other than resins, a silicon oxide or a magnesium fluoride may be used. Moreover, the light-transmitting member 604 may be formed by stacking a plurality of material layers of different materials without limitation to one material.

In a method for manufacturing the polarizer, which is illustrated in FIG. 6, the polarizer may be formed using a nanoimprint method, a photolithography method, an E-beam lithography method, a holography method, laser etching, or the like. Moreover, the polarizer shown in FIG. 6 may be manufactured by combination of the methods.

This embodiment mode can be freely combined with Embodiment Mode 1.

Embodiment Mode 3

Figure 7:
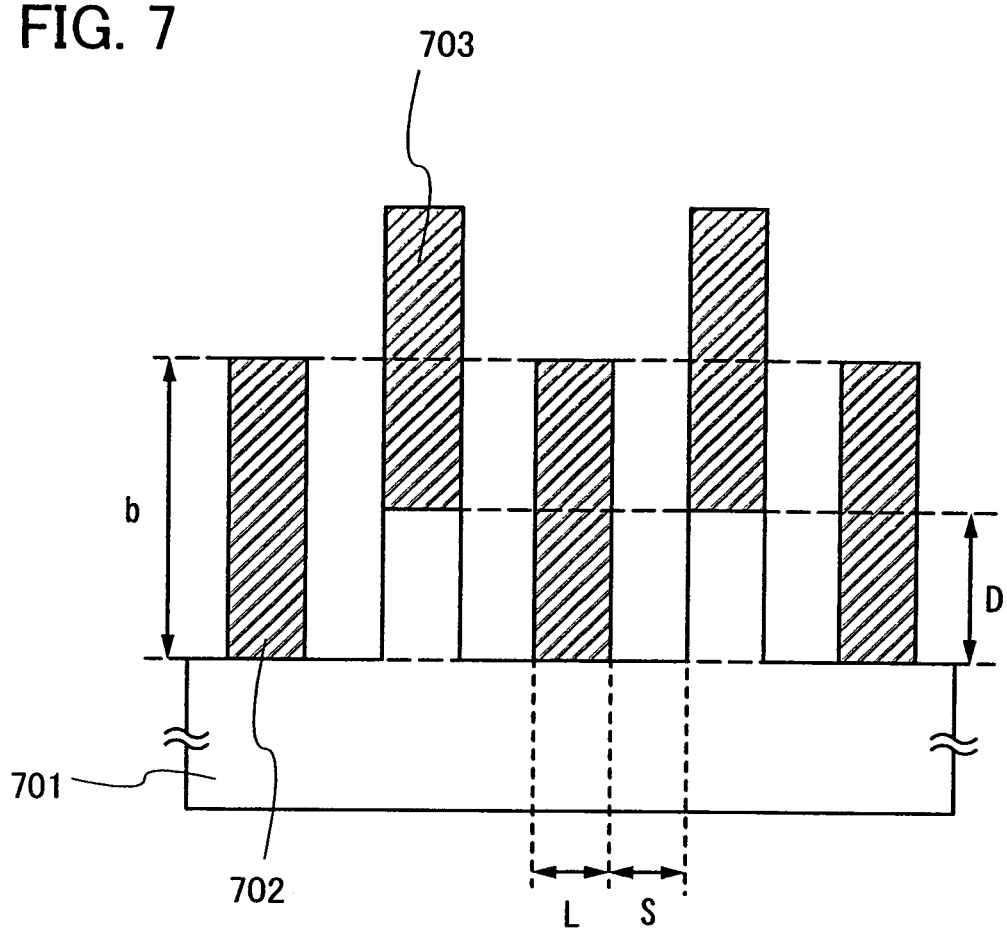
FIG. 7 is a cross-sectional view illustrating an example of a wire grid structure of the present invention.

FIG. 7 illustrates another example of a polarizer having a wire grid structure of the present invention. In this embodiment mode, a polarizer in which grooves are formed on a light-transmitting substrate 701, a first group of metal wires 702 are provided on the grooves of the substrate, and a second group of metal wires 703 are provided on projections of the substrate. A method for manufacturing such a polarizer will be described below.

First, a light-transmitting substrate 701 is prepared. A light-transmitting material such as glass, ceramics, a resin or the like can be used for the light-transmitting substrate 701. Further, a high refractive index glass substrate of which refractive index is controlled by controlling impurities in glass can be used for the light-transmitting substrate 701.

Next, the light-transmitting substrate 701 is processed to form grooves with a width of (L+2S). As a method for processing the light-transmitting substrate 701, a laser etching method, a sand blasting method, a photolithography method, or the like is used. Here, the grooves are formed using a laser oscillator operating with a pulse width of femtoseconds ($10^{-15}$ seconds). A laser in which a dopant of Nd, Yb, Cr, Ti, Ho, Er, or the like is added to a crystal of sapphire, YAG YAG ceramics, $Y_2O_3$ ceramics, KGW (potassium gadolinium tungstate), $Mg_2SiO_4$, YLF, $YVO_4$, $GdVO_4$, or the like can be used for an ultrashort pulsed laser oscillator.

In a laser etching method, processing in a laser wavelength level or smaller using a normal laser is difficult; however, using an ultrashort pulsed laser, processing can be performed with only the central part having high energy density; thus microfabrication (processing in a laser wavelength level or smaller) can be realized.

Next, an aluminum film is formed and a mask is formed by a nanoimprint method. The aluminum film is etched using the mask to form the first group of metal wires 702 and the second group of metal wires 703; thus, a polarizer having a wire grid structure as shown in FIG. 7 can be manufactured.

A process of manufacturing the wire grid structure shown in FIG. 7 is not limited to the above procedure. For example, the wire grid structure can be formed using a nanoimprint method such as a photo nanoimprint method or a thermal nanoimprint method; a photolithography method; an E-beam lithography method; a holography method; or the like as appropriate.

In this embodiment mode, "substrate surface" refers to not an upper surface of a projection on the substrate but a bottom surface of a groove on the substrate. Further, the projections of the substrate correspond to the light-transmitting members described in Embodiment Mode 1. With the structure shown in this embodiment mode, the light-transmitting members and the substrate which are described in Embodiment Mode 1 can be formed of the same material, so that they can have the same refractive index with respect to incident light. Thus, as compared with Embodiment Mode 1, a polarizer with less effect of light refraction can be obtained.

Further, this embodiment mode can be freely combined with Embodiment Mode 1 or Embodiment Mode 2.

Embodiment Mode 4

Figure 8:
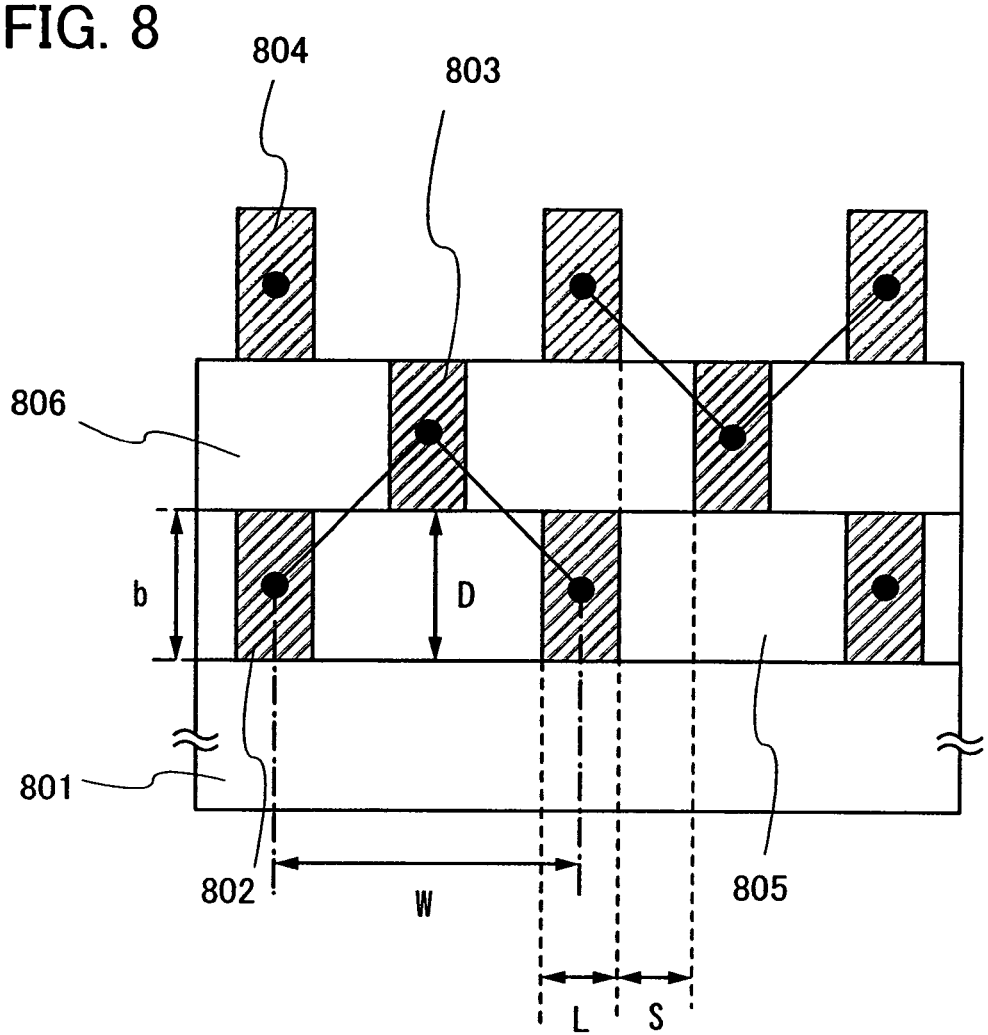
FIG. 8 is a cross-sectional view illustrating an example of a wire grid structure of the present invention.

FIG. 8 illustrates another example of a polarizer having a wire grid structure of the present invention. In this embodiment mode, a polarizer including a light-transmitting substrate 801, a first group of metal wires 802, a second group of metal wires 803, and a third group of metal wires 804 is described. A method for manufacturing such a polarizer will be described.

In a multilayer structure shown in FIG. 8, multiple metal wires which are thinner than the metal wires used in Embodiment Mode 1 are provided in multiple layers. For example, in the case where the thickness of the metal wires in Embodiment Mode 1 is 200 nm, each metal wire in this embodiment mode is assumed to have a thickness of 100 nm. When the ratio of the width of metal wires and the thickness of metal wires is decreased, margin in the manufacturing process of metal wires can be broadened.

The polarizer shown in FIG. 8 includes the light-transmitting substrate 801, the first group of metal wires 802 each having a center on a first plane parallel to the light-transmitting substrate 801, the second group of metal wires 803 each having a center on a second plane parallel to the light-transmitting substrate 801, and the third group of metal wires 804 each having a center on a third plane parallel to the light-transmitting substrate. The first group of metal wires 802 and the third group of metal wires 804 overlap with each other in the polarizer. Further, the first group of metal wires 802 and the third group of metal wires 804 have the same number of metal wires at approximately the same intervals; therefore, an interval, that is, a pitch, has the same length as the metal wires in Embodiment Mode 3.

In the polarizer shown in FIG. 8, the first group of metal wires and the second group of metal wires are parallel in the long-side direction of the metal wires; the heights of the first group of metal wires and the second group of metal wires, from a surface of the light-transmitting substrate are different; and a metal wire of the second group is provided to be more distant from the light-transmitting substrate than the first group of metal wires by distance D. Further, the distance D is almost the same as the thickness b of the first group of metal wires.

A manufacturing method of the polarizer will be described below.

First, the light-transmitting substrate 801 is prepared. Here, a glass substrate is used. Then, the first group of metal wires 802 are formed. Here, the first group of metal wires 802 are formed using a photo nanoimprint method. Specifically, a first aluminum film is formed over the light-transmitting substrate 801, a thin film is formed over the first aluminum film by a coating method, a mold is pressed against the thin film to form a mask having recesses, the mold is removed from the thin film, the first aluminum film is selectively etched using the mask; thereby forming the first group of metal wires 802.

Next, after the mask is removed, a light-transmitting insulating film, for example, a silicon oxide film obtained by PCVD is formed.

Next, the light-transmitting insulating film is partially etched so that the upper surfaces of the first group of metal wires 802 are exposed. Here, chemical mechanical polishing (CMP) is performed. Thus, first light-transmitting members 805 are each formed between the first group of metal wires 802.

Next, in order to form the second group of metal wires 803, a second aluminum film is formed over the first light-transmitting members 805 and the first group of metal wires 802. Although not shown, since upper surfaces of the first group of metal wires 802 are exposed, an oxide film is formed on the upper surfaces. Therefore, the first group of metal wires 802 are not in contact with the second aluminum film formed here. This oxide film is made to serve as an etching stopper in a subsequent etching process.

Next, the second group of metal wires 803 are formed using a photo nanoimprint method the same as the first group of metal wires 802. A thin film is formed over the second aluminum film by a coating method, a mold is pressed against the thin film to form a mask having recesses, the mold is removed from the thin film, and the second aluminum film is selectively etched using the mask, thereby forming the second group of metal wires 803. In the etching process here, an oxide film is formed on the upper surfaces of the first group of metal wires 802, and this oxide film serves as an etching stopper.

Next, after the mask is removed, a light-transmitting insulating film, for example, a silicon oxide film obtained by PCVD is formed.

Next, the light-transmitting insulating film is partially etched so that the upper surfaces of the second group of metal wires 803 are exposed. Here, chemical mechanical polishing (CMP) is performed. Thus, second light-transmitting members 806 are each formed between the second group of metal wires 803.

Next, the third group of metal wires 804 are formed. Specifically, a third aluminum film is formed over the second light-transmitting members 806 and the second group of metal wires 803, a thin film is formed over the third aluminum film by a coating method, a mold is pressed against the thin film to form a mask having recesses, the mold is removed from the thin film, and the third aluminum film is selectively etched using the mask, thereby forming the third group of metal wires 804. Also in the etching process here, an oxide film is formed over the upper surfaces of the second group of metal wires 803, and this oxide film functions as an etching stopper.

Through the above steps the polarizer shown in FIG. 8 can be manufactured.

In the polarizer obtained through the above steps, a glass substrate is used, aluminum is used for the metal wires, and a silicon oxide is used for the light-transmitting member; therefore, a polarizer having higher heat resistance as compared with a conventional polarizer using iodine can be obtained. Therefore, a liquid crystal panel equipped with the polarizer can be used without limitation on the use conditions, and they can be used for displays of projectors, vehicle-mounted displays which are required to resist heat.

Further, metal wires are formed in three layers in the above process for example; however, metal wires may be formed in four or more layers.

Note that a photo nanoimprint method is used for example in the above process; alternatively, without limitation to the above process, a thermal nanoimprint method, a photolithography method, an E-beam lithography method, a holography method, laser etching, or the like may be used for the formation. Further, the polarizer shown in FIG. 8 may be manufactured by combination of the methods.

Further, this embodiment mode can be freely combined with any of Embodiment Modes 1 to 3.

Embodiment Mode 5

Figure 9A:
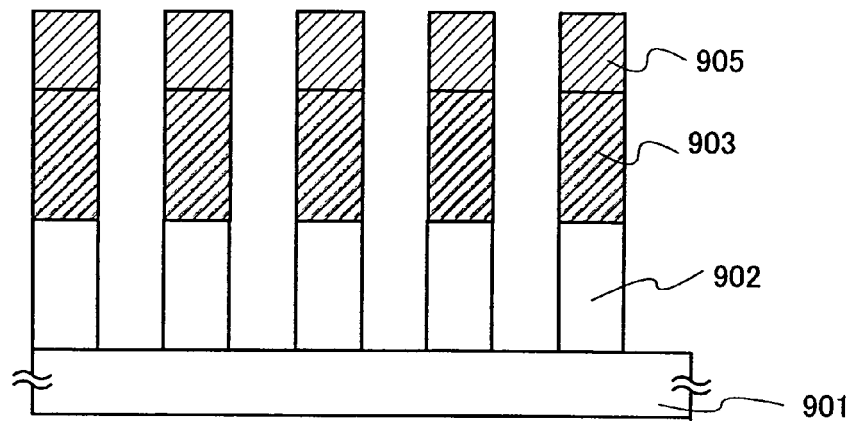
FIGS. 9A to 9C are cross-sectional views illustrating an example of a manufacturing process of a wire grid structure according to the present invention.

In this embodiment mode, an example of manufacturing a polarizer using a manufacturing method different from the above embodiment modes will be described with reference to FIG. 9A, FIG. 9B, and FIG. 9C. A manufacturing method of the polarizer will be described below.

First, a light-transmitting substrate 901 is prepared.

Next, a dielectric film of silicon oxide or magnesium fluoride is formed over the light-transmitting substrate 901. The dielectric film is formed using vacuum deposition, sputtering, PCVD, ion plating, or the like.

Next, a first aluminum film is formed over the dielectric film. Then, a thin film is formed over the first aluminum film by a coating method, a mold is pressed against the thin film to form a mask having recesses, the mold is removed from the thin film, and the first aluminum film is selectively etched using the mask, thereby forming a second group of metal wires 903. Next, the dielectric film is etched using the mask left after the formation of the second group of metal wires as a mask 905 to form light-transmitting members 902. FIG. 9A illustrates a cross-sectional view at this stage.

Figure 9B:
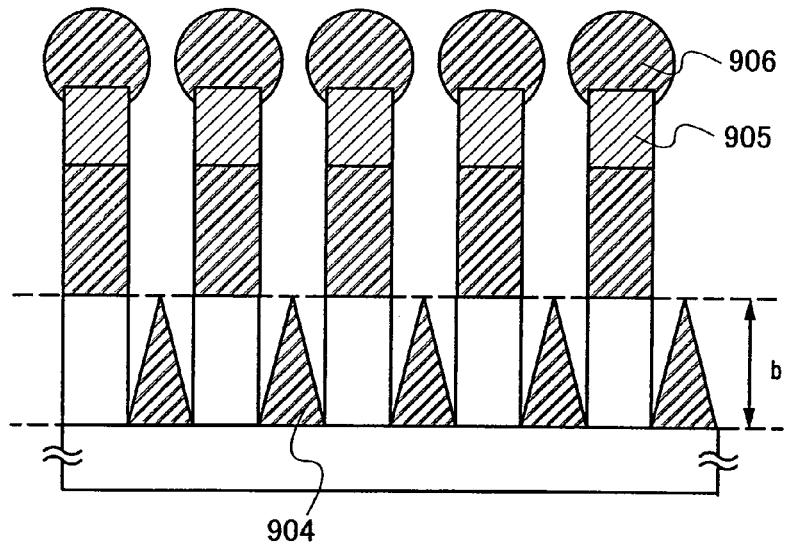

Next, when a second aluminum film is formed by vapor deposition or sputtering, as shown in FIG. 9B, metal films 906 are formed over the mask 905, and a first group of metal wires 904 are each formed between the light-transmitting members 902.

Figure 9C:
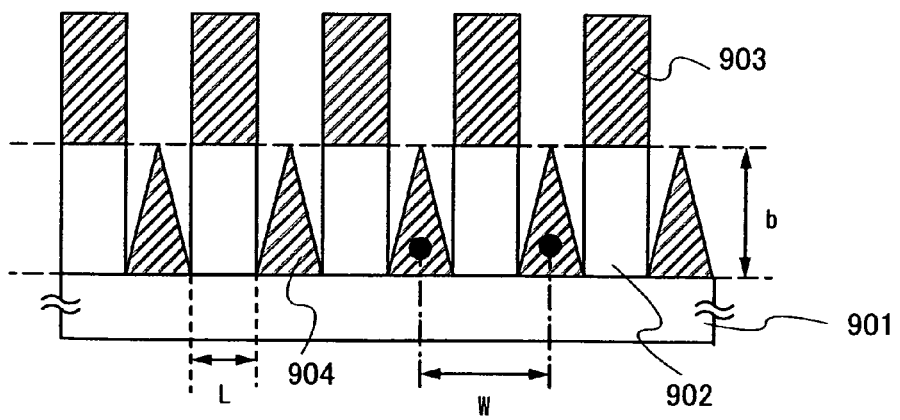

When the mask 905 is removed, the metal films 906 are also removed; thus, the polarizer shown in FIG. 9C is obtained. As shown in FIG. 9C, the first group of metal wires 904 each have a triangular cross-sectional shape, which is different from a rectangular cross-sectional shape of the second group of metal wires 903.

In this embodiment mode, an example in which the second group of metal wires 903 are formed first, and then the first group of metal wires 904 are formed is described. Further, spacing S between the first group of metal wires and the second group of metal wires in X direction is 0; however, since the first group of metal wires 904 each have a triangular cross-sectional shape, the tips of the first group of metal wires 904 are apart from the second group of metal wires 903.

Figure 10:
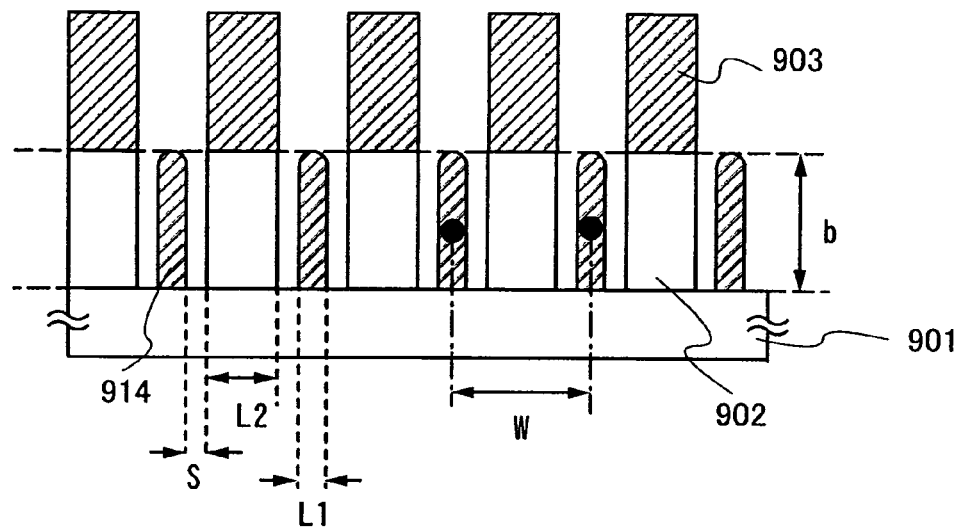
FIG. 10 is a cross-sectional view illustrating an example of a wire grid structure of the present invention.

Alternatively, a structure shown in FIG. 10 may be employed to provide spacing S in X direction. The cross-sectional shape of the first group of metal wires is not limited in particular unless the first group of metal wires and the second group of metal wires are in contact with each other, and the first group of metal wires 914 may have a cross-sectional shape with a curved tip. The structure shown in FIG. 10 is an example in which the first group of metal wires 914 are evenly spaced, and the second group of metal wires 903 are evenly spaced; however, the intervals between the first group of metal wires 914 are different from the intervals between the second group of metal wires 903. Further, the structure shown in FIG. 10 is an example in which a width L1 of each of the first group of metal wires 914 is smaller than a width L2 of each of the second group of metal wires 903. The widths of the metal wires may be different, as long as a structure is obtained in which a pitch that is a distance between the centers in cross sections of adjacent two metal wires among the first group is repeated as one cycle. The pitch is ⅓ or less of the wavelength of incident light, desirably, ¼ or less of the wavelength of incident light. Further, the width L1 of the first group of metal wires 914 and the width L2 of the second group of metal wires 903 is ¹⁄₁₀ or less of the wavelength of incident light.

Figure 11:
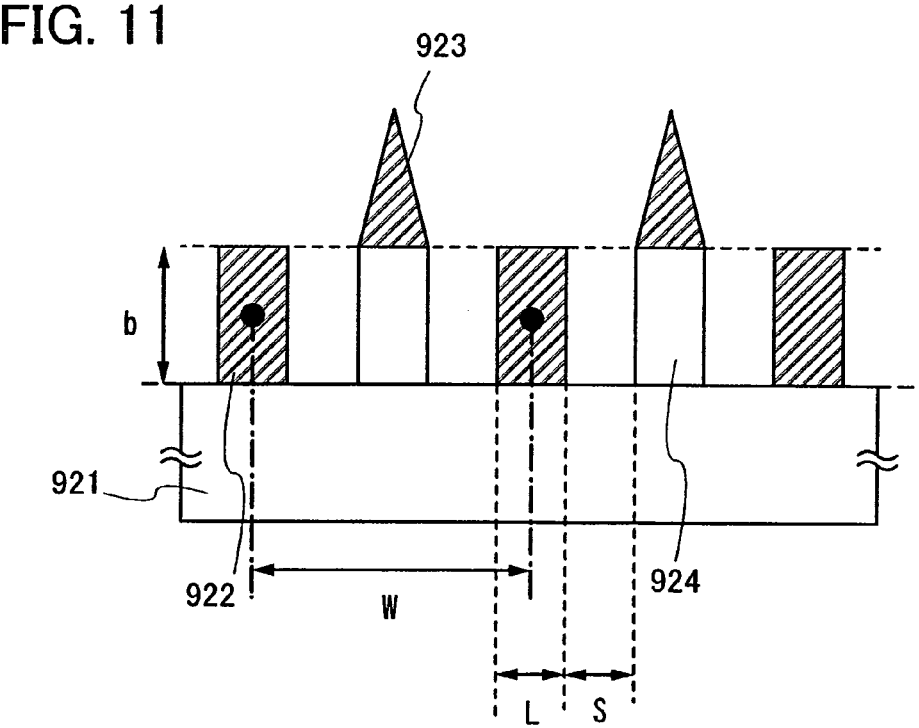
FIG. 11 is a cross-sectional view illustrating an example of a wire grid structure of the present invention.

Further, cross-sectional shapes of the second group of metal wires are not limited in particular as long as the tips of the first group of metal wires are apart from the second group of metal wires. A second group of metal wires 923 may have a triangular cross-sectional shape as shown in FIG. 11. FIG. 11 illustrates an example in which a first group of metal wires 922 have a rectangular cross-sectional shape. Note that FIG. 11 illustrates an example in which light-transmitting members 924 are formed over a light-transmitting substrate 921, and the second group of metal wires 923 are formed over the light-transmitting members 924.

Further, this embodiment mode can be freely combined with any of Embodiment Modes 1 to 4.

The present invention having the above structure will be described in more detail in Embodiment below.

Embodiment 1

Examples of liquid crystal display devices and electronic devices of the present invention includes the following: cameras such as video cameras or digital cameras, goggle type displays (head mounted displays), navigation systems, sound reproduction devices (car audio components, audio components, or the like), notebook personal computers, projector devices, game machines, portable information terminals (a mobile computer, a mobile telephone, a mobile game machine, an electronic book device, or the like), image reproduction devices equipped with a recording medium (specifically, a device that reproduces content of the recording medium such as a digital versatile disc (DVD), which is equipped with a display for displaying the image), and the like. Specific examples of those electronic devices are shown in FIGS. 12A to 12D and FIG. 13.

Figure 12A:
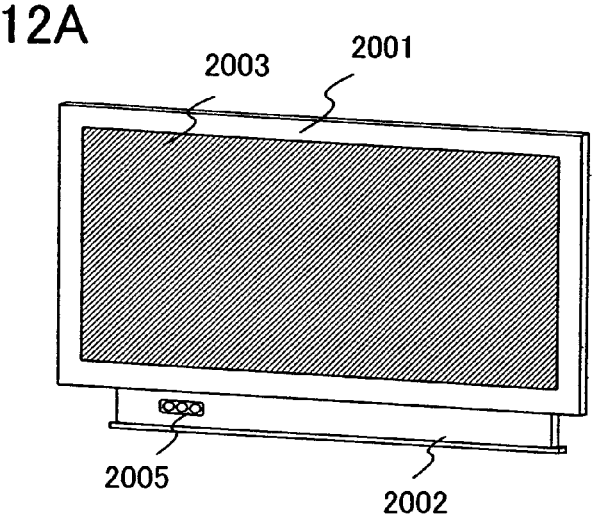
FIGS. 12A to 12D are diagrams illustrating examples of electronic devices.

FIG. 12A shows a large-sized display device having a 22-inch to 50-inch large screen, which includes a chassis 2001, a support 2002, a display portion 2003, a video input terminal 2005, and the like. The display portion 2003 corresponds to the liquid crystal module of Embodiment 1. It is to be noted that the display device includes all display devices for displaying information such as for a personal computer, TV broadcast reception, and interactive TV. The present invention can achieve a large-sized display device capable of performing high contrast display even when a glass substrate of or after the fifth generation having a side of more than 1000 mm is used because parallel transmittance can be increased as compared with a conventional wire grid structure.

Figure 12B:
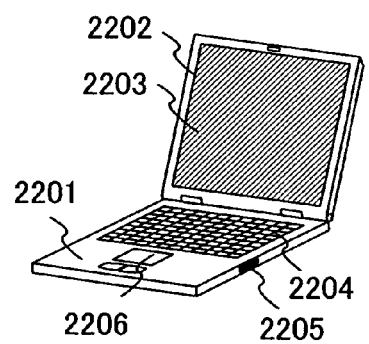

FIG. 12B shows a notebook personal computer, which includes a main body 2201, a chassis 2202, a display portion 2203, a keyboard 2204, an external connection port 2205, a pointing device 2206, and the like. The present invention can achieve a notebook personal computer capable performing display with a wide color reproduction range can be realized.

Figure 12C:
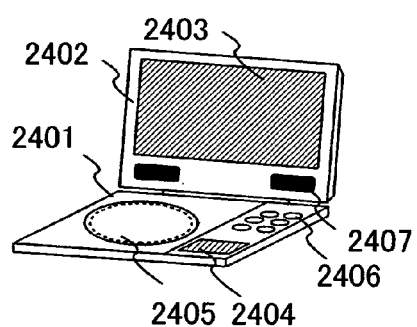

FIG. 12C shows a mobile image reproduction device equipped with a recording medium (specifically, a DVD reproduction device), which includes a main body 2401, a chassis 2402, a display portion A 2403, a display portion B 2404, a recording medium (DVD or the like) reading portion 2405, an operation key 2406, a speaker portion 2407, and the like. The display portion A 2403 mainly displays image information, and the display portion B 2404 mainly displays character information. It is to be noted that the image reproduction device equipped with a recording medium includes a home-use game machine and the like. Since parallel transmittance can be increased as compared with a conventional wire grid structure, an image reproduction device capable of performing high contrast display can be realized.

Figure 12D:
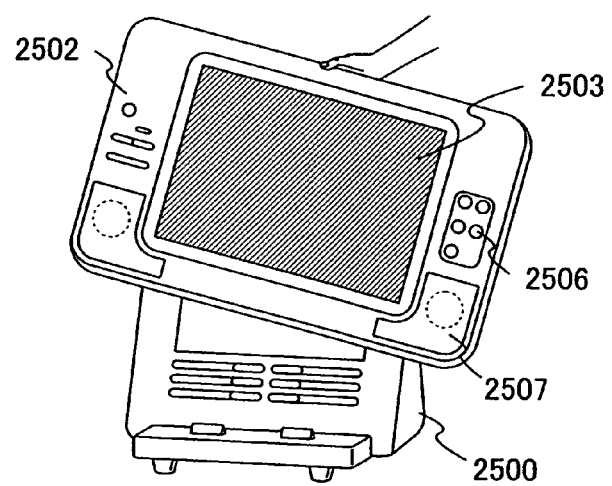
Figure 13:
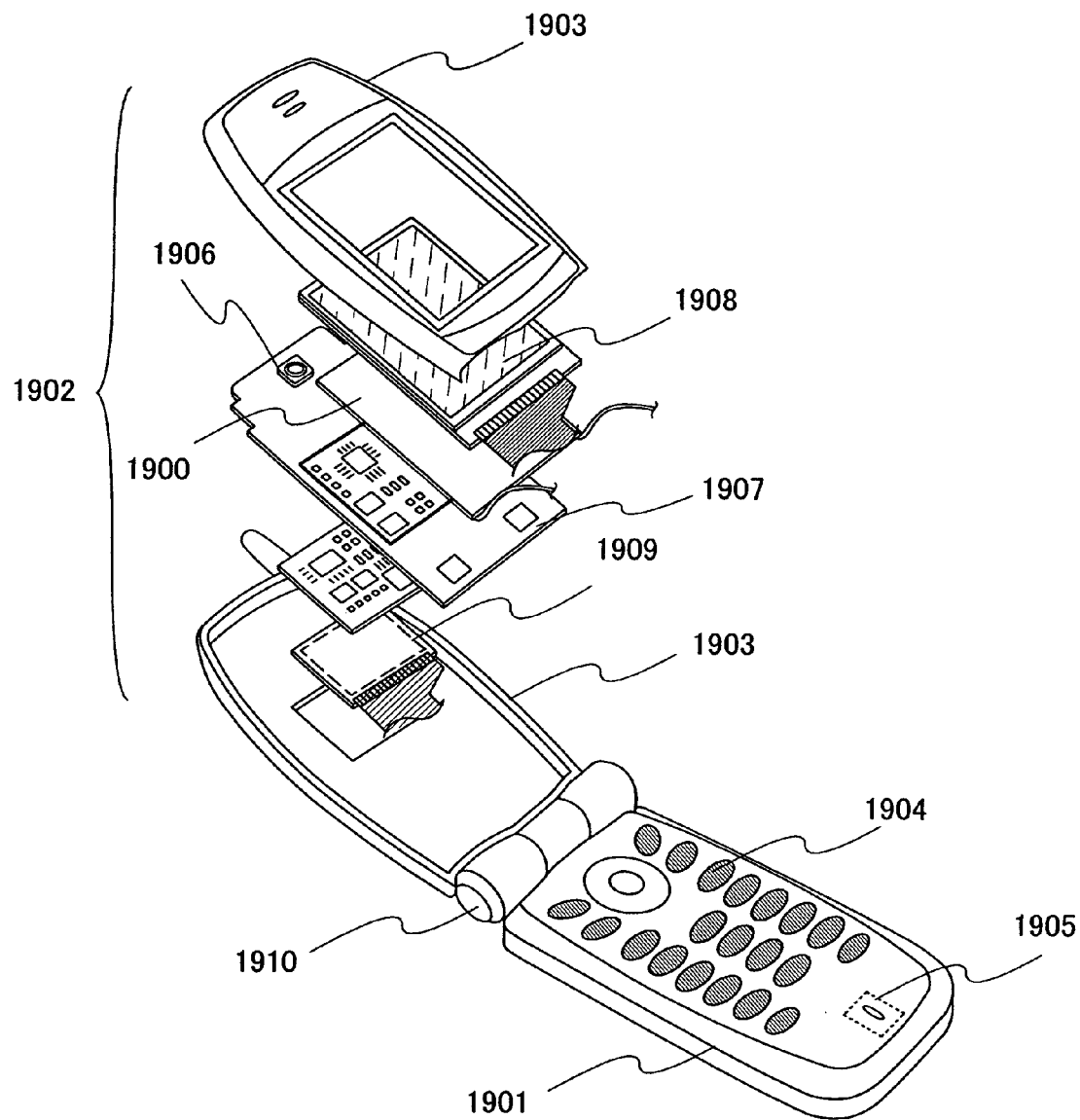
FIG. 13 is a diagram illustrating an example of an electronic device.

FIG. 12D shows a TV, only a display of which can be carried wirelessly. A chassis 2502 incorporates a battery and a signal receiver, and a display portion 2503 and a speaker portion 2507 are driven by the battery. The battery can be charged repeatedly by using a battery charger 2500. The battery charger 2500 can send and receive video signals, which can be sent to the signal receiver of the display. The chassis 2502 is controlled by an operation key 2506. Since the device shown in FIG. 12D can transmit signals from the chassis 2502 to the battery charger 2500 by operating the operation key 2506, it can also be referred to as a video and audio interactive communication device. In addition, since the device can send signals from the chassis 2502 to the battery charger 2500 by operating the operation key 2506 and can control communication of another electronic device by causing the electronic device to receive signals sent from the battery charger 2500, it can also be referred to as a general-purpose remote control device. Since parallel transmittance can be increased in accordance with the present invention as compared with a conventional wire grid structure, a display capable of performing high contrast display can be realized.

In a mobile phone shown in FIG. 5, a main body (A) 1901 including operation switches 1904, a microphone 1905, and the like is connected to a main body (B) 1902 including a display panel (A) 1908, a display panel (B) 1909, a speaker 1906, and the like by a hinge 1910 so as to be able to open and close. The display panel (A) 1908, a backlight unit 1900, and the display panel (B) 1909 are stored in a chassis 1903 of the main body (B) 1902 together with a circuit board 1907 and the backlight unit 1900. Pixel portions of the display panel (A) 1908 and the display panel (B) 1909 are arranged so as to be visible through open windows formed in the chassis 1903. Here, the backlight unit 1900 and the display panel (A) 1908 are provided such that they overlap with each other to form a transmissive-type liquid crystal display device. As the backlight unit 1900, a cold-cathode tube or an LED element may be used. Further, a light guide plate and an LED element can be combined and used as the backlight unit.

As for the display panel (A) 1908 and the display panel (B) 1909, specifications such as the number of pixels can be appropriately set in accordance with functions of the mobile phone 1900. For example, the display panel (A) 1908 and the display panel (B) 1909 can be combined as a main screen and a sub-screen, respectively.

Further, different kinds of display panels may be used, for example, a liquid crystal display device may be used as the display panel (A) while an EL element is used for the display panel (B) in a light-emitting display device.

The mobile phone of this embodiment can take various forms depending on functions or applications thereof. For example, it may be formed as a mobile phone equipped with a camera by incorporating an imaging element in the hinge 1910. Further, the operation switches 1904, the display panel (A) 1908, and the display panel (B) 1909 may be housed in one chassis.

Figure 14A:
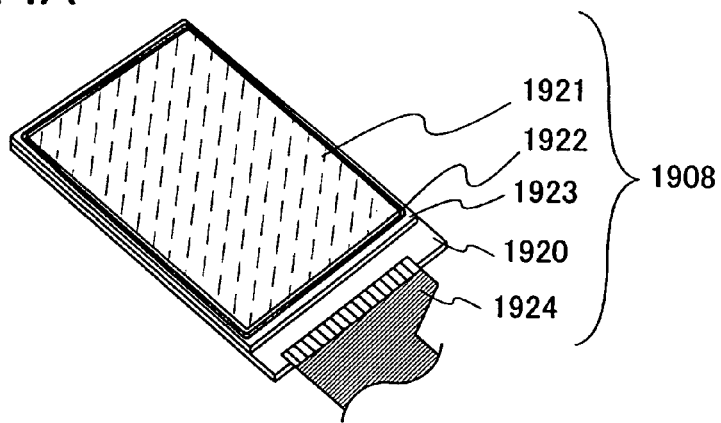
FIGS. 14A to 14D are perspective views of liquid crystal display devices.

FIG. 14A shows an example of a structure of the display panel (A) 1908. In the display panel (A) 1908, a first substrate 1920 provided with a pixel electrode, and a second substrate 1923 which faces the first substrate are attached to each other with a sealant 1922. In addition, the sealant 1922 is formed such that it surrounds a display portion 1921, and a liquid crystal layer is provided in a region enclosed by the first substrate, the second substrate, and the sealant. In the display panel (A) 1908 shown in FIG. 14A, liquid crystal is sealed by utilizing a liquid crystal dropping method, and attaching the substrates under a reduced pressure. The gap between the pair of substrates is maintained with a spacer; specifically, a spherical spacer, a columnar spacer, a filler in a sealant, or the like. Note that the spacer may be selected as appropriate depending on a liquid crystal mode (a TN mode, a VA mode, an IPS mode, or the like) for driving the display panel (A) 1908. Note that although the second substrate is not always provided with an electrode in an IPS mode, in other modes the second substrate is often provided with a counter electrode; and in such a case, when the pair of substrates is attached, connection for electrically connecting the counter electrode to a terminal electrode provided on the first substrate is also carried out. Reference numeral 1924 denotes a Flexible printed circuit (FPC).

Figure 14B:
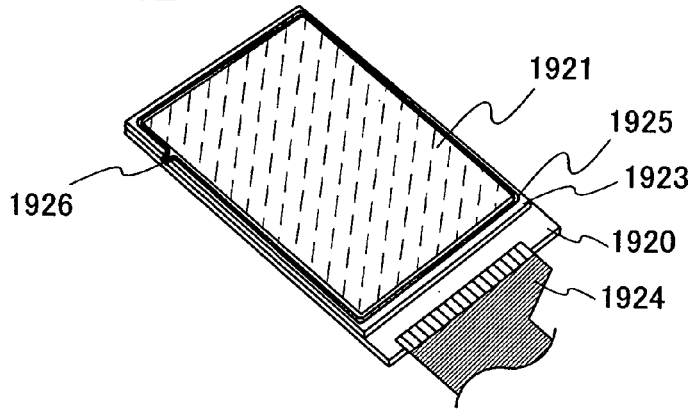

FIG. 14B shows a structure example of a panel manufactured utilizing a method of sealing liquid crystal which differs to that of FIG. 14A. Note that in FIG. 14B, portions which are the same as those in FIG. 14A are denoted by the same reference numerals as those used in FIG. 14A. In the display panel shown in FIG. 14B, liquid crystal is injected through an inlet for injecting liquid crystal which is formed by a first sealant 1925, using a liquid crystal injecting method or the like, and then the inlet for injecting liquid crystal is sealed by a second sealant 1926.

Figure 14C:
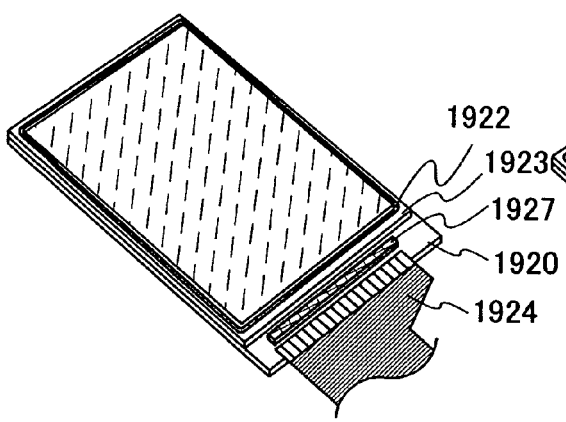

FIG. 14C shows a structure example of a panel which differs from that of FIG. 14A. Note that in FIG. 14C, portions which are the same as those in FIG. 14A are denoted by the same reference numerals as those used in FIG. 14A. In the display panel shown in FIG. 14C, a driver IC 1927 for driving the display panel is mounted over the first substrate 1920. The driver IC 1927 is mounted over the first substrate 1920 so that integration of a circuit is achieved.

Figure 14D:
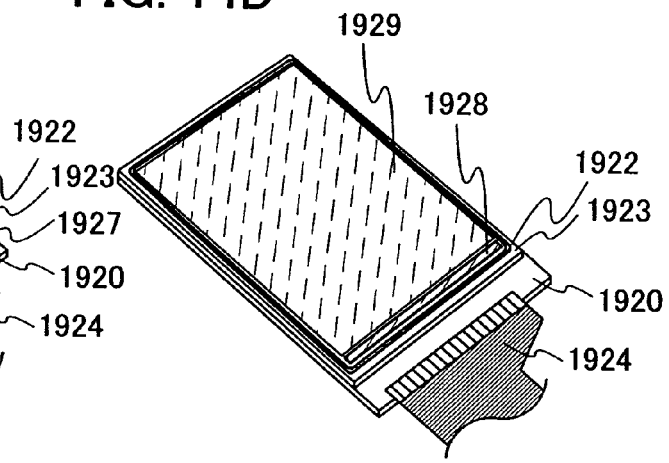

FIG. 14D shows a structure example of a panel which differs from that of FIG. 14A. Note that in FIG. 14D, portions which are the same as those in FIG. 14A are denoted by the same reference numerals as those used in FIG. 14A. In the panel shown in FIG. 14D, a display portion 1929 and a driver circuit 1928 for driving the display portion 1929 are formed over one substrate, the first substrate 1920. As the driver circuit 1928, amorphous silicon TFTs, polysilicon TFTs, and the like can be used. Further, another circuit (such as an optical sensor circuit or a CPU) may be provided over the same substrate as the driver circuit.

In the display panels shown in FIGS. 14A to 14D, a desired optical film such as a polarizer, an antireflection film, or a color filter is provided by being stacked. In the present invention, the polarizer shown in the embodiment modes is made to overlap with a display panel (A) 1908, parallel transmittance can be increased as compared with the conventional wire grid structure, which makes it possible to perform high contrast display.

Figure 17:
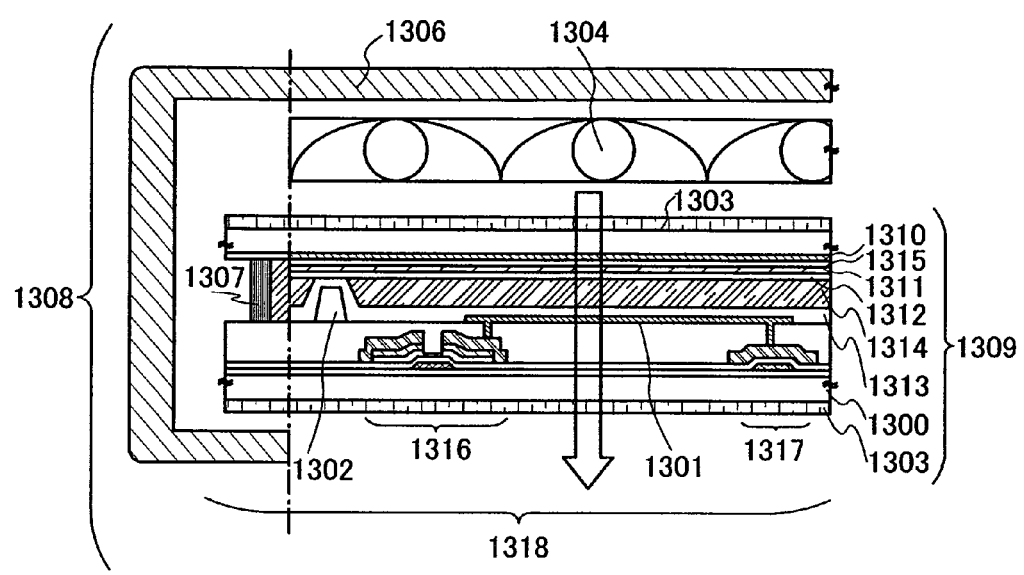
FIG. 17 is a cross-sectional view illustrating an active matrix liquid crystal display device.

As illustrated partly in FIG. 17, the display panel 1309 is provided with a back light valve 1304 and a mirror (not shown) and covered by a cover 1306, and an active matrix liquid crystal display device 1308 (transparent type) is completed. The back light 1304 may be arranged not to overlap with a display region of the display panel 1309, and a light conductive plate may be used. Further, the cover 1306 and the display panel 1309 are secured by adhesive or organic resin. Since the active matrix liquid crystal display device 1308 is a transparent type, a polarized plate 1303 is pasted onto both of the substrate 1300 and the opposing substrate 1305. In addition, another optical film (antireflection film, a polarized film, or the like) or a protective film (not shown) may be provided. Although an active matrix liquid crystal display device is shown in FIG. 17, a passive matrix liquid crystal display device can be used.

In FIG. 17, reference numeral 1300 denotes a substrate; 1301, a pixel electrode; 1302, a columnar spacer; 1307, sealant; 1310, a color filter in which a colored layer and a light-shielding layer are arranged to correspond to each pixel; 1315, a planarized film; 1311, an opposing electrode; 1312, 1313, oriented films; 1314, a liquid crystal layer; 1317, a capacitor; 1316, a thin film transistor (TFT); and 1318, a pixel portion. As a thin film transistor which constitutes the pixel portion 1318, an amorphous silicon TFT; a crystal silicon TFT, a semi-amorphous TFT, and a single crystal TFT can be used.

Figure 15A:
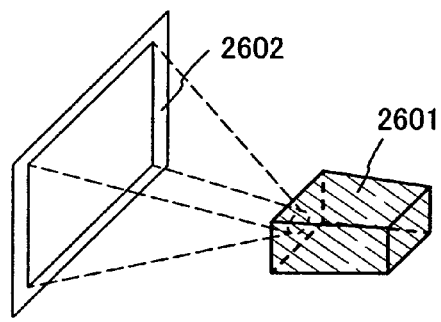
FIGS. 15A to 15D are diagrams illustrating examples of liquid crystal projector devices.

FIG. 15A is a front projector, which includes a projection device 2601 and a screen 2602. A polarizer of the present invention can be applied to a liquid crystal module 2808 partially constituting the projection device 2601.

Figure 15B:
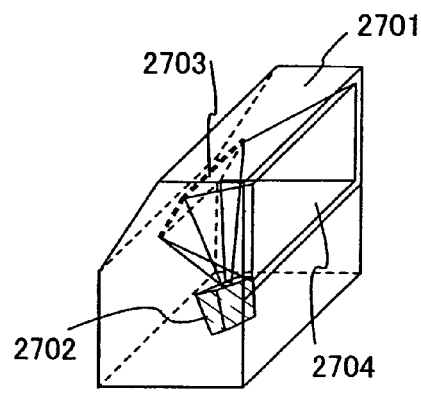

FIG. 15B is a rear projector, which includes a main body 2701, a projection device 2702, a mirror 2703, and a screen 2704. The present invention can be applied to a liquid crystal module 2808 partially constituting the projection device.

Figure 15C:
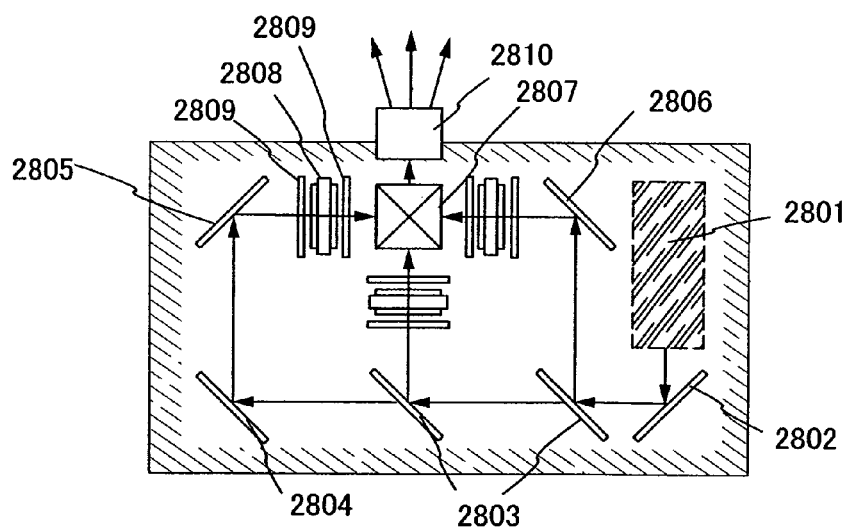

FIG. 15C is a diagram illustrating a structure example of the projection devices 2601 and 2702 in FIGS. 15A and 15B. The projection devices 2601 and 2702 each include a light-source optical system 2801, mirrors 2802 and 2804 to 2806, a dichroic mirror 2803, a prism 2807, a liquid crystal module 2808, a retardation film 2809, and a projection optical system 2810. The projection optical system 2810 is constituted by an optical system including a projection lens. Although an example of a three-plate mode is shown in this embodiment, the mode is not particularly limited to this, and for example, a single-plate mode may be employed. A practitioner may provide an optical system such as an optical lens, a film for adjustment of a phase difference, or an IR film as appropriate in a light path indicated by arrows in FIG. 15C.

Figure 15D:
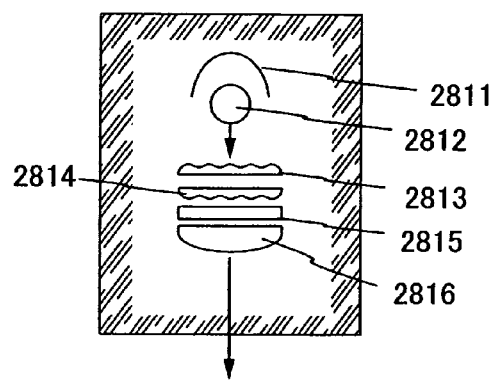
Figure 16:
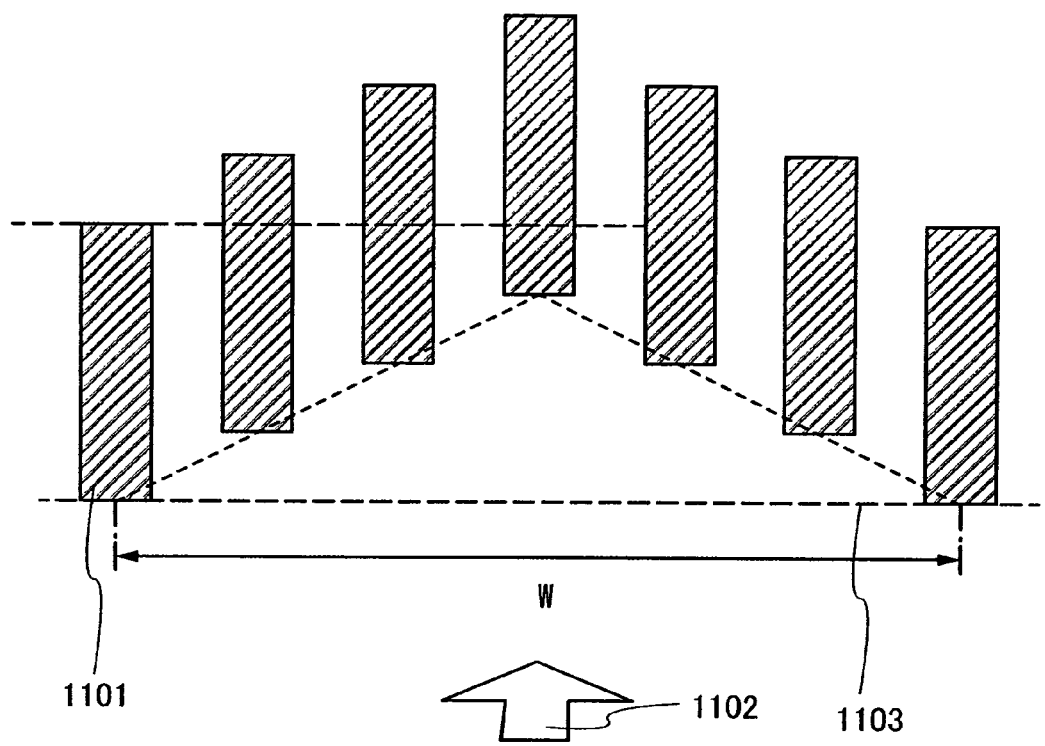
FIG. 16 is a cross-sectional view illustrating a comparative example.

FIG. 15D is a diagram illustrating a structure example of the light-source optical system 2801 in FIG. 15C. In this embodiment, the light-source optical system 2801 includes a reflector 2811, a light source 2812, lens arrays 2813 and 2814, a polarization-conversion 2815, and a condensing lens 2816. Note that the light-source optical system shown in FIG. 15D is just an example, and it is not particularly limited to this. For example, a practitioner may provide an optical system such as an optical lens, a film for adjustment of a phase difference, or an IR film as appropriate in the light-source optical system.

Since front projectors and rear projectors have an intense light source, a liquid crystal module and a polarizer are heated to a high temperature. In accordance with this embodiment, a polarizer having a wire grid structure can be formed using a highly heat-resistant inorganic material, which is advantageous. Further, as compared with a conventional wire grid structure, parallel transmittance is higher, and high contrast display can be realized.

As described above, a liquid crystal display device obtained by implementing the present invention may be used as display portions of all kinds of various electronic devices.

This embodiment can be freely combined with any of Embodiment Modes 1 to 5.

In the invention, a polarizer having an excellent wire grid structure with which parallel transmittance $T_P$ is increased, and crossed transmittance $T_C$ is decreased can achieved. Further, display devices in which color irregularities in a visible light region is reduced can be achieved.

This application is based on Japanese Patent Application serial no. 2007-179034 filed with Japan Patent Office on Jul. 6, 2007, the entire contents of which are hereby incorporated by reference.

What is claimed is:

1. A polarizer comprising:
a light-transmitting substrate;
first metal wires over the light-transmitting substrate;
light-transmitting members in contact with the light-transmitting substrate;
second metal wires over the light-transmitting members; and
spacings evenly interposed between the first metal wires and the second metal wires,
wherein a width of each spacing corresponds to a width in a short-side direction of the first metal wires,
wherein one of the light-transmitting members is between adjacent two of the first metal wires, and
wherein the first metal wires and the second metal wires overlap with each other in a direction parallel to the short-side direction of the first metal wires.

2. The polarizer according to claim 1, wherein a distance between adjacent two of the first metal wires is ⅓ or less of a wavelength of an incident light to the polarizer.

3. The polarizer according to claim 1, wherein the first metal wires and the second metal wires are in parallel with the light-transmitting substrate.

4. The polarizer according to claim 1, wherein the first metal wires and the second metal wires are in parallel with each other.

5. The polarizer according to claim 1, wherein a distance between a bottom surface of each of the first metal wires and the light-transmitting substrate is substantially constant.

6. The polarizer according to claim 1, wherein a distance between a bottom surface of each of the second metal wires and the light-transmitting substrate is substantially constant.

7. The polarizer according to claim 1, wherein cross sections of the light-transmitting members have an inverted tapered shape.

8. The polarizer according to claim 1, wherein the light-transmitting members includes at least one of resin, silicon oxide and magnesium fluoride.

9. The polarizer according to claim 1, wherein cross sections of the first metal wires have a triangular shape.

10. The polarizer according to claim 1, wherein cross sections of the second metal wires have a triangular shape.

11. The polarizer according to claim 1, wherein a thickness of the first metal wires and the second metal wires is 50 nm to 800 nm.

12. The polarizer according to claim 1, wherein the first metal wires and the second metal wires include aluminum, silver, gold, copper, or an alloy thereof.

13. The polarizer according to claim 1, wherein the polarizer is incorporated into an electronic device selected from the group consisting of a video camera, a digital camera, a goggle type display, a navigation system, a sound reproduction device, a personal computer, a projector device, a game machine, a mobile computer, a mobile telephone, a mobile game machine, an electronic book device, and an image reproduction device.

14. The polarizer according to claim 1, wherein each of the first metal wires and each of the second metal wires are provided with a gap, respectively.

15. A polarizer comprising:
a light-transmitting substrate;
first metal wires over the light-transmitting substrate;
light-transmitting members in contact with the light-transmitting substrate;
second metal wires over the light-transmitting members; and
spacings evenly interposed between the first metal wires and the second metal wires,
wherein a width of each spacing corresponds to a width in a short-side direction of the first metal wires,
wherein the first metal wires are on a first level in parallel with the light-transmitting substrate, each of the first metal wires having a first center, wherein the second metal wires are provided on a second level in parallel with the light-transmitting substrate, each of the second metal wires having a second center,
wherein the first metal wires are parallel to the second metal wires in a longitudinal direction of the first metal wires and the second metal wires,
wherein the first metal wires and the second metal wires are arranged so that a plurality of lines connecting first centers and second centers adjacent to each other become a zigzag line in a cross section perpendicular to the longitudinal direction, and
wherein the first metal wires and the second metal wires overlap with each other in a direction parallel to the short-side direction of the first metal wires.

16. The polarizer according to claim 15, wherein one of the second metal wires is between adjacent two of the first metal wires.

17. The polarizer according to claim 15, wherein a distance between the first centers adjacent to each other is ⅓ or less of a wavelength of an incident light to the polarizer.

18. The polarizer according to claim 15, wherein cross sections of the first metal wires have a triangular shape.

19. The polarizer according to claim 15, wherein cross sections of the second metal wires have a triangular shape.

20. The polarizer according to claim 15, wherein a thickness of the first metal wires and the second metal wires is 50 nm to 800 nm.

21. The polarizer according to claim 15, wherein the first metal wires and the second metal wires include aluminum, silver, gold, copper, or an alloy thereof.

22. The polarizer according to claim 15, wherein the polarizer is incorporated into an electronic device selected from the group consisting of a video camera, a digital camera, a goggle type display, a navigation system, a sound reproduction device, a personal computer, a projector device, a game machine, a mobile computer, a mobile telephone, a mobile game machine, an electronic book device, and an image reproduction device.

23. The polarizer according to claim 15, each of the first metal wires and each of the second metal wires are provided with a gap, respectively.

24. A display device comprising:
a display element; and
a polarizer over the display element, the polarizer comprising:
a light-transmitting substrate;
first metal wires over the light-transmitting substrate;
light-transmitting members in contact with the light-transmitting substrate;
second metal wires over the light-transmitting members; and
spacings evenly interposed between the first metal wires and the second metal wires,
wherein a width of each spacing corresponds to a width in a short-side direction of the first metal wires,
wherein one of the light-transmitting members is between adjacent two of the first metal wires, and
wherein the first metal wires and the second metal wires overlap with each other in a direction parallel to the short-side direction of the first metal wires.

25. The display device according to claim 24, wherein a distance between adjacent two of the first metal wires is ⅓ or less of a wavelength of an incident light to the polarizer.

26. The display device according to claim 24, wherein the first metal wires and the second metal wires are in parallel with each other.

27. The display device according to claim 24, wherein a distance between a bottom surface of one of the first metal wires and the light-transmitting substrate is substantially constant.

28. The display device according to claim 24, wherein a distance between a bottom surface of one of the second metal wires and the light-transmitting substrate is substantially constant.

29. The display device according to claim 24, wherein cross sections of the light-transmitting members have an inverted tapered shape.

30. The display device according to claim 24, wherein the light-transmitting members includes at least one of resin, silicon oxide and magnesium fluoride.

31. The display device according to claim 24, wherein cross sections of the first metal wires have a triangular shape.

32. The display device according to claim 24, wherein cross sections of the second metal wires have a triangular shape.

33. The display device according to claim 24, further comprising third metal wires over the second metal wires.

34. The display device according to claim 24, wherein the display device is incorporated into an electronic device selected from the group consisting of a video camera, a digital camera, a goggle type display, a navigation system, a sound reproduction device, a personal computer, a projector device, a game machine, a mobile computer, a mobile telephone, a mobile game machine, an electronic book device, and an image reproduction device.

35. A display device comprising:
a display element; and
a polarizer over the display element, the polarizer comprising:
a light-transmitting substrate;
first metal wires over the light-transmitting substrate;
light-transmitting members in contact with the light-transmitting substrate;
second metal wires over the light-transmitting members; and spacings evenly interposed between the first metal wires and the second metal wires, wherein a width of each spacing corresponds to a width in a short-side direction of the first metal wires, wherein the first metal wires are on a first level in parallel with the light-transmitting substrate, each of the first metal wires having a first center, wherein the second metal wires are on a second level in parallel with the light-transmitting substrate, each of the second metal wires having a second center, wherein the first metal wires are parallel to the second metal wires in a longitudinal direction of the first metal wires and the second metal wires, wherein the first metal wires and the second metal wires are arranged so that a plurality of lines connecting first centers and second centers adjacent to each other become a zigzag line in a cross section perpendicular to the longitudinal direction, and wherein the first metal wires and the second metal wires overlap with each other in a direction parallel to the short-side direction of the first metal wires.

36. The display device according to claim 35, wherein a distance between adjacent two of the first metal wires is ⅓ or less of a wavelength of an incident light to the polarizer.

37. The display device according to claim 35, wherein a distance between a bottom surface of one of the first metal wires and the light-transmitting substrate is substantially constant.

38. The display device according to claim 35, wherein a distance between a bottom surface of one of the second metal wires and the light-transmitting substrate is substantially constant.

39. The display device according to claim 35, wherein cross sections of the light-transmitting members have an inverted tapered shape.

40. The display device according to claim 35, wherein the light-transmitting members includes at least one of resin, silicon oxide and magnesium fluoride.

41. The display device according to claim 35, wherein cross sections of the first metal wires have a triangular shape.

42. The display device according to claim 35, wherein cross sections of the second metal wires have a triangular shape.

43. The display device according to claim 35, further comprising third metal wires over the second metal wires.

44. The display device according to claim 35, wherein the display device is incorporated into an electronic device selected from the group consisting of a video camera, a digital camera, a goggle type display, a navigation system, a sound reproduction device, a personal computer, a projector device, a game machine, a mobile computer, a mobile telephone, a mobile game machine, an electronic book device, and an image reproduction device.

* * * * *

UNITED STATES PATENT AND TRADEMARK OFFICE
CERTIFICATE OF CORRECTION

| | | |
|---|---|---|
| PATENT NO. | : 8,493,658 B2 | Page 1 of 1 |
| APPLICATION NO. | : 12/213616 | |
| DATED | : July 23, 2013 | |
| INVENTOR(S) | : Jiro Nishida et al. | |

It is certified that error appears in the above-identified patent and that said Letters Patent is hereby corrected as shown below:

In the Claims

In claim 15, column 19, line 30, please delete the word "provided".

Signed and Sealed this
Thirty-first Day of December, 2013

Margaret A. Focarino
*Commissioner for Patents of the United States Patent and Trademark Office*

UNITED STATES PATENT AND TRADEMARK OFFICE
CERTIFICATE OF CORRECTION

| | | |
|---|---|---|
| PATENT NO. | : 8,493,658 B2 | Page 1 of 1 |
| APPLICATION NO. | : 12/213616 | |
| DATED | : July 23, 2013 | |
| INVENTOR(S) | : Nishida et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1166 days.

Signed and Sealed this
Twenty-seventh Day of January, 2015

Michelle K. Lee
*Deputy Director of the United States Patent and Trademark Office*